(12) United States Patent
Ishiguchi

(10) Patent No.: US 7,982,910 B2
(45) Date of Patent: Jul. 19, 2011

(54) IMAGE PROCESSING APPARATUS, IMAGE PROCESSING METHOD, IMAGE OUTPUT APPARATUS, AND IMAGE PROCESSING SYSTEM

(75) Inventor: Kazuhiro Ishiguchi, Kumamoto (JP)

(73) Assignee: Mitsubishi Electric Corporation, Tokyo (JP)

( * ) Notice: Subject to any disclaimer, the term of this patent is extended or adjusted under 35 U.S.C. 154(b) by 610 days.

(21) Appl. No.: 11/695,220

(22) Filed: Apr. 2, 2007

(65) Prior Publication Data

US 2007/0236713 A1    Oct. 11, 2007

(30) Foreign Application Priority Data

Apr. 10, 2006    (JP) ................. 2006-107312

(51) Int. Cl.
    *G06F 15/00*    (2006.01)
(52) U.S. Cl. .......... 358/1.9; 358/2.1; 358/518; 358/519; 382/232; 382/167
(58) Field of Classification Search .................. 358/1.9, 358/2.1, 518; 382/232, 167
    See application file for complete search history.

(56) References Cited

U.S. PATENT DOCUMENTS

| | | | |
|---|---|---|---|
| 6,160,916 A * | 12/2000 | Horiuchi ................. | 382/232 |
| 6,229,916 B1 | 5/2001 | Ohkubo | |
| 6,639,628 B1 | 10/2003 | Lee et al. | |
| 6,717,585 B2 * | 4/2004 | Kagawa et al. ............. | 345/600 |
| 7,110,001 B2 | 9/2006 | Sasaki | |
| 7,330,190 B2 | 2/2008 | Sasaki | |
| 7,417,762 B2 | 8/2008 | Arai | |
| 2003/0008666 A1 * | 1/2003 | Ohmura et al. ............. | 455/456 |
| 2008/0123999 A1 | 5/2008 | Ishiga | |

FOREIGN PATENT DOCUMENTS

JP    11-112819    4/1999

(Continued)

OTHER PUBLICATIONS

Takamori Shimazu, et al. "High Fidelity Color Reproduction Method for Displays in Order to Suprese the color tracking," Technical Report of IEICE, EID 2003-82 (Feb. 2004), vol. 103, No. 649, pp. 37-40 (with English Abstract and English Translation of an Extract).

*Primary Examiner* — Twyler L Haskins
*Assistant Examiner* — Michael Burleson
(74) *Attorney, Agent, or Firm* — Oblon, Spivak, McClelland, Maier & Neustadt, L.L.P.

(57) ABSTRACT

The present invention is provided with a storage section that holds characteristic data, a predicted output value calculating section that calculates predicted PCS values $(X_P, Y_P, Z_P)$ in a predetermined designated color space, an error calculating section that calculates an error from the difference between the PCS values (X, Y, Z) and the predicted PCS values, a differential coefficient matrix creating section that creates a differential coefficient matrix, an inverse matrix calculating section, a primary-color intensity correction amount calculating section that calculates a corrected primary-color intensity by performing a primary conversion to the difference between the PCS values and the predicted PCS values with an inverse matrix defined as a conversion matrix, and a primary-color intensity correction section that calculates the output primary-color intensity by adding or subtracting to or from a temporal primary-color intensity (IR, IG, IB) the corrected primary-color intensity calculated at the primary-color intensity corrected amount calculating section.

20 Claims, 15 Drawing Sheets

FOREIGN PATENT DOCUMENTS

| | | |
|---|---|---|
| JP | 2000-50092 | 2/2000 |
| JP | 2000-138948 | 5/2000 |
| JP | 2001-86360 | 3/2001 |
| JP | 2001-312254 | 11/2001 |
| JP | 2002-116750 | 4/2002 |
| JP | 2002-218268 | 8/2002 |
| JP | 2003-78772 | 3/2003 |
| JP | 2003-248467 | 9/2003 |
| JP | 2005-222327 | 8/2005 |
| WO | WO 2006/006373 | 1/2006 |

* cited by examiner

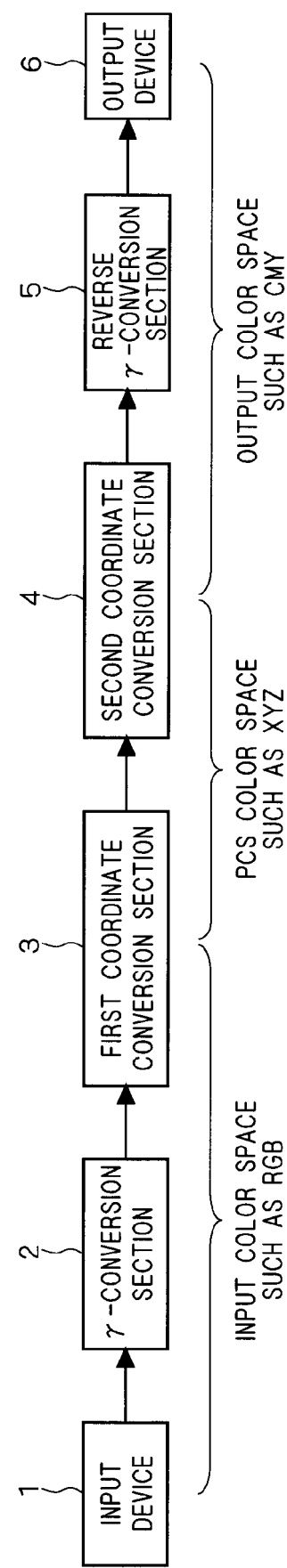
F I G. 1

F I G . 7

```
//CALCULATION OF TEMPORAL INTENSITIES TempR, TempG, TempB
TempR = RX * X + RY * Y + RZ * Z; TempG = GX * X + GY * Y + GZ * Z;
TempB = BX * X + BY * Y + BZ * Z;
//FIXED NUMBER OF TIMES (TWICE) OF LOOP
for(I=0; I<2; I++)
{
        //EXPONENTIATION CALCULATION (UP TO THIRD-ORDER) of TempR, TempG,
        //and TempB IS PERFORMED FIRST IN ORDER TO REDUCE CALCULATION AMOUNT.
        R1 = TempR;  R2 =R1 * TempR;  R3 =R2 * TempR;
        G1 = TempG;  G2 =G1 * TempG;  G3 =G2 * TempG;
        B1 = TempB;  B2 =B1 * TempB;  B3 =B2 * TempB;
        //CALCULATION OF PREDICTED PCS VALUES (PredX, PredY, PredZ)
        PredX = XR1 * R1 + XR2 * R2 + XR3 * R3
              + XG1 * G1 + XG2 * G2 + XG3 * G3
              + XB1 * B1 + XB2 * B2 + XB3 * B3;
        PredY = YR1 * R1 + YR2 * R2 + YR3 * R3
              + YG1 * G1 + YG2 * G2 + YG3 * G3
              + YB1 * B1 + YB2 * B2 + YB3 * B3;
        PredZ = ZR1 * R1 + ZR2 * R2 + ZR3 * R3
              + ZG1 * G1 + ZG2 * G2 + ZG3 * G3
              + ZB1 * B1 + ZB2 * B2 + ZB3 * B3;
        //CALCULATION OF PCS ERROR
        DeltaX = X- PredX;  DeltaY = Y- PredY;  DeltaZ = Z- PredZ;
        CALCULATION OF DIFFERENTIAL COEFFICIENT MATRIX COEFFICIENT
        (THE COEFFICIENT OF 2 * XR2 MAY BE CALCULATED BEFOREHAND,
         BUT IT IS LEFT FOR EASY UNDERSTANDING)
        DXR = XR1 + 2 * XR2 * R1 + 3 * XR3 * R2;
        DXG = XG1 + 2 * XG2 * R1 + 3 * XG3 * R2;
        DXB = XB1 + 2 * XB2 * R1 + 3 * XB3 * R2;
        DXR = XR1 + 2 * XR2 * R1 + 3 * XR3 * R2;
        DXG = XG1 + 2 * XG2 * R1 + 3 * XG3 * R2;
        DXB = XB1 + 2 * XB2 * R1 + 3 * XB3 * R2;
        DXR = XR1 + 2 * XR2 * R1 + 3 * XR3 * R2;
        DXG = XG1 + 2 * XG2 * R1 + 3 * XG3 * R2;
        DXB = XB1 + 2 * XB2 * R1 + 3 * XB3 * R2;
        //CALCULATION OF INVERSE MATRIX OF DIFFERENTIAL COEFFICIENT
        DRX=DYG*DZB-DYB*DZG;  DRY=DZG*DXB-DZB*DXG;  DRZ=DXG*DYB-DXB*DYG;
        DGX=DYB*DZR-DYR*DZB;  DGY=DZB*DXR-DZR*DXB;  DGZ=DXB*DYR-DXR*DYB;
        DBX=DYR*DZG-DYG*DZR;  DBY=DZR*DXG-DZG*DXR;  DBZ=DXR*DYG-DXG*DYR;
        MD = DXR * DRX + DXG * DRY + DXB * DRZ; //MATRIX EQUATION
        DRX / = MD; DRY / = MD; DRZ / = MD;
        DGX / = MD; DGY / = MD; DGZ / = MD;
        DBX / = MD; DBY / = MD; DBZ / = MD;
        //CORRECTION OF R,G,B INTENSITY
        DeltaR = DRX * DeltaX + DRY * DeltaY + DRZ * DeltaZ;
        DeltaG = DGX * DeltaX + DGY * DeltaY + DGZ * DeltaZ;
        DeltaB = DBX * DeltaX + DBY * DeltaY + DBZ * DeltaZ;
        //CORRECTION OF R,G,B INTENSITY
        TempR += DeltaR;  TempG += DeltaG;  TempB += DeltaB;
```

FIG. 8

| XR3 | 0.1140 |
|---|---|
| XR2 | -0.0240 |
| XR1 | 0.3625 |
| YR3 | 0.0585 |
| YR2 | -0.0074 |
| YR1 | 0.2052 |
| ZR3 | -0.0166 |
| ZR2 | 0.0042 |
| ZR1 | 0.0554 |

| XG3 | 0.0527 |
|---|---|
| XG2 | -0.0023 |
| XG1 | 0.2928 |
| YG3 | 0.1003 |
| YG2 | -0.0399 |
| YG1 | 0.5537 |
| ZG3 | -0.0203 |
| ZG2 | 0.0148 |
| ZG1 | 0.1165 |

| XB3 | -0.0310 |
|---|---|
| XB2 | -0.0051 |
| XB1 | 0.1893 |
| YB3 | -0.0036 |
| YB2 | 0.0050 |
| YB1 | 0.1239 |
| ZB3 | -0.2545 |
| ZB2 | 0.0548 |
| ZB1 | 0.9708 |

| RX | 3.2488 | RY | -1.3758 | RZ | 0.0146 |
|---|---|---|---|---|---|
| GX | -1.7504 | GY | 2.4191 | GZ | -0.2494 |
| BX | -0.3612 | BY | -0.1196 | BZ | 1.3343 |

FIG. 9

```
//CALCULATION OF PREDICTED PCS VALUES (PredX, PredY, PredZ)
PredX = PredY = PredZ = 0;
//WITH REGARD TO R
if(TempR<0)
{
        PredX += XR1 * TempR;  PredY += YR1 * TempR;  PredZ += ZR1 * TempR;
}
else if(TempR > 1)
{
        PredX += (XR1 + XR2 + XR3) +  (XR1 + 2 * XR2 + 3 * XR3) * (TempR -1);
        PredY += (YR1 + YZ2 + XR3) +  (YR1 + 2 * YR2 + 3 * YR3) * (TempR -1);
        PredZ += (ZR1 + XR2 + ZR3) +  (ZR1 + 2 * ZR2 + 3 * ZR3) * (TempR -1);
}
else
{
        PredX += XR1 * R1 + XR2 * R2 + XR3 * R3
        PredY += YR1 * R1 + YR2 * R2 + YR3 * R3
        PredZ += ZR1 * R1 + ZR2 * R2 + ZR3 * R3
}
//WITH REGARD TO G
if(TempG<0)
{
        PredX += XG1 * TempG;  PredY += YG1 * TempG;  PredZ += ZG1 * TempG;
}
else if(TempG > 1)
{
        PredX += (XG1 + XG2 + XG3) +  (XG1 + 2 * XG2 + 3 * XG3) * (TempG -1);
        PredY += (YG1 + YG2 + XG3) +  (YG1 + 2 * YG2 + 3 * YG3) * (TempG -1);
        PredZ += (ZG1 + XG2 + ZG3) +  (ZG1 + 2 * ZG2 + 3 * ZG3) * (TempG -1);
}
else
{
        PredX += XG1 * G1 + XG2 * G2 + XG3 * G3
        PredY += YG1 * G1 + YG2 * G2 + YG3 * G3
        PredZ += ZG1 * G1 + ZG2 * G2 + ZG3 * G3
}
//WITH REGARD TO B
if(TempB<0)
{
        PredX += XB1 * TempB;  PredY += YB1 * TempB;  PredZ += ZB1 * TempB;
}
else if(TempB > 1)
{
        PredX += (XB1 + XB2 + XB3) +  (XB1 + 2 * XB2 + 3 * XB3) * (TempB -1);
        PredY += (YB1 + YB2 + XB3) +  (YB1 + 2 * YB2 + 3 * YB3) * (TempB -1);
        PredZ += (ZB1 + XB2 + ZB3) +  (ZB1 + 2 * ZB2 + 3 * ZB3) * (TempB -1);
}
else
{
        PredX += XB1 * G1 + XB2 * G2 + XB3 * G3
        PredY += YB1 * G1 + YB2 * G2 + YB3 * G3
        PredZ += ZB1 * G1 + ZB2 * G2 + ZB3 * G3
}
```

FIG. 10

```
//CALCULATION OF DIFFERENTIAL COEFFICIENT MATRIX COEFFICIENT
//WITH REGARD TO R
if(TempR<0)
{
        DXR = XR1;  DYR = YR1;  DZR = ZR1;
}
else if(TempR>1)
{
        DXR = XR1 + 2 * XR2 + 3 * XR3;
        DYR = YR1 + 2 * YR2 + 3 * YR3;
        DZR = ZR1 + 2 * ZR2 + 3 * ZR3;
}
else
{
        DXR = XR1 + 2 * XR2 * R1 + 3 * XR3 * R2;
        DYR = YR1 + 2 * YR2 * R1 + 3 * YR3 * R2;
        DZR = ZR1 + 2 * ZR2 * R1 + 3 * ZR3 * R2;
}
//WITH REGARD TO G
if(TempG<0)
{
        DXG = XG1;  DYG = YG1;  DZG = ZG1;
}
else if(TempG>1)
{
        DXG = XG1 + 2 * XG2 + 3 * XG3;
        DYG = YG1 + 2 * YG2 + 3 * YG3;
        DZG = ZG1 + 2 * ZG2 + 3 * ZG3;
}
else
{
        DXG = XG1 + 2 * XG2 * G1 + 3 * XG3 * G2;
        DYG = YG1 + 2 * YG2 * G1 + 3 * YG3 * G2;
        DZG = ZG1 + 2 * ZG2 * G1 + 3 * ZG3 * G2;
}
//WITH REGARD TO B
if(TempB<0)
{
        DXB = XB1;  DYB = YB1;  DZB = ZB1;
}
else if(TempB>1)
{
        DXB = XB1 + 2 * XB2 + 3 * XB3;
        DYB = YB1 + 2 * YB2 + 3 * YB3;
        DZB = ZB1 + 2 * ZB2 + 3 * ZB3;
}
else
{
        DXB = XB1 + 2 * XB2 * B1 + 3 * XB3 * B2;
        DYB = YB1 + 2 * YB2 * B1 + 3 * YB3 * B2;
        DZB = ZB1 + 2 * ZB2 * B1 + 3 * ZB3 * B2;
}
```

F I G . 1 1
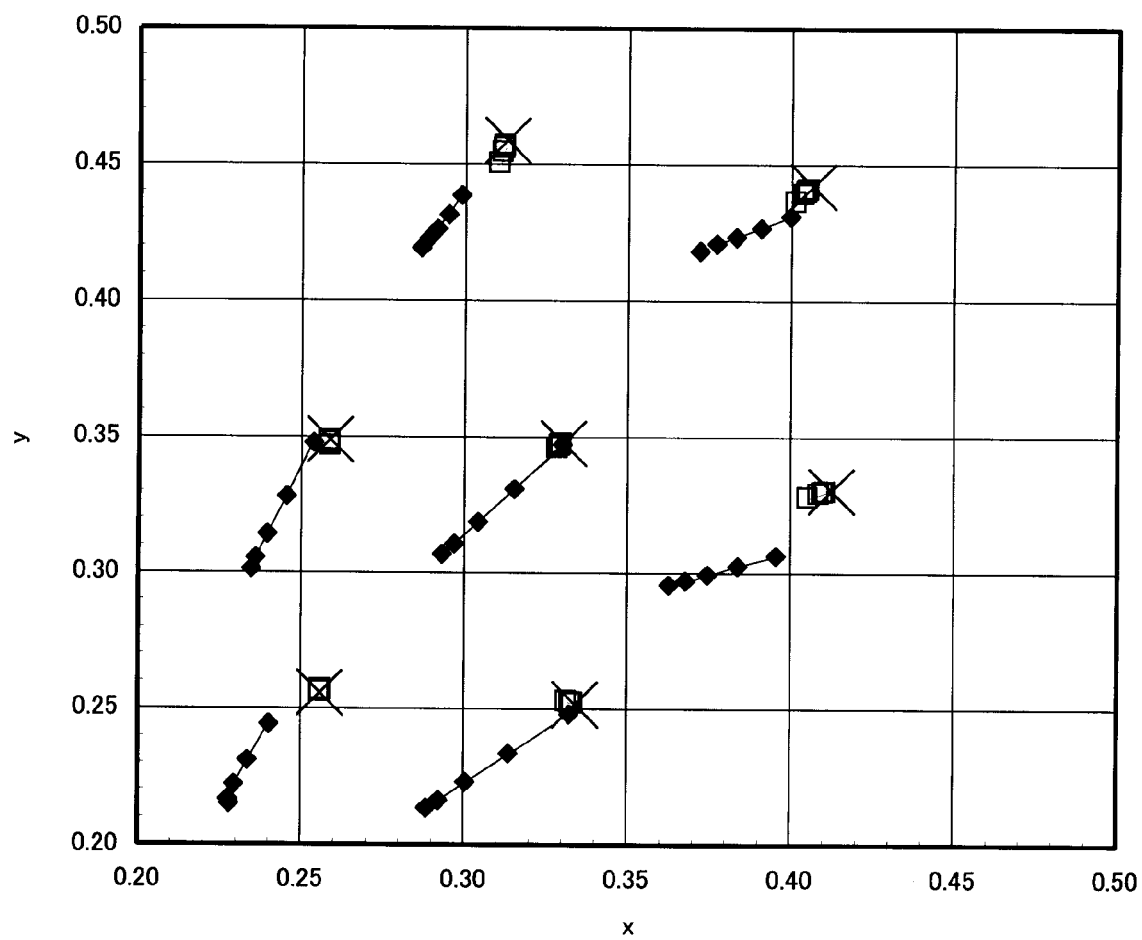

FIG. 12

| PRIMARY-COLOR INTENSITY | CONTROL VALUE |
|---|---|
| 0.000000 | 0.000000 |
| 0.000786 | 0.062745 |
| 0.003327 | 0.125490 |
| 0.007598 | 0.188235 |
| 0.014460 | 0.250980 |
| 0.031511 | 0.313725 |
| 0.051576 | 0.376471 |
| 0.082409 | 0.439216 |
| 0.126958 | 0.501961 |
| 0.182294 | 0.564706 |
| 0.250285 | 0.627451 |
| 0.314208 | 0.690196 |
| 0.405197 | 0.752941 |
| 0.512198 | 0.815686 |
| 0.635647 | 0.878431 |
| 0.802804 | 0.941176 |
| 1.000000 | 1.000000 |

FIG. 15

```
//IRS, IGS, IBS ARE INPUTTED, AND IRD, IGD, IBD ARE OUTPUTTED.
//IT IS SUPPOSED THAT GetRSR( ), GetRSG( ), GetRSB( ), GetGSR( ), GetGSG( ),
//GetGSB( ), GetBSR( ), GetBSG( ), GetBSB( ) ARE FUNCTIONS FOR ACQUIRING
//PREDICTED PCS VALUES BY CONVERSION INTO FUNCTION OR LUT WITH THE USE OF
//PARAMETER OF DEVICE CHARACTERISTIC DATA, AND THEY ARE SEPARATELY DEFINED.
//IT IS SUPPOSED THAT GetDRSR( ), GetGSG( ), and GetBSB( ) ARE FUNCTIONS FOR
//ACQUIRING DIFFERENTIAL COEFFICIENT OF PREDICTED PCS VALUES BY CONVERSION INTO
//FUNCTION OR LUT WITH THE USE OF PARAMETER OF DEVICE CHARACTERISTIC DATA,
//AND THEY ARE SEPARATELY DEFINED.

//CALCULATION OF PREDICTED PCS VALUES (PredRS, PredGS, PredBS)
PredRS = GetRSR(IRS) + GetRSG(IGS) + GetRSB(IBS);
PredGS = GetGSR(IRS) + GetGSG(IGS) + GetGSB(IBS);
PredBS = GetBSR(IRS) + GetBSG(IGS) + GetBSB(IBS);

//CALCULATION OF PCS ERROR
DeltaRS = IRS - PredRS;
DeltaGS = IGS - PredGS;
DeltaBS = IBS - PredBS;
//SINCE DIFFERENTIAL COEFFICIENT INVERSE MATRIX CALCULATION IS SIMPLE,
// IT IS PUT TOGETHER TO THE CALCULATION OF RGB CORRECTED INTENSITY.

//CALCULATION OF RGB CORRECTED INTENSITY
DeltaRD = DeltaRS / GetDRSR(IRS);
DeltaGD = DeltaGS / GetDGSG(IGS);
DeltaBD = DeltaBS / GetDBSB(IBS);

//CALCULATION OF DEVICE R,G,B INTENSITY
IRD = IRS + DeltaRD;
IGD = IGS + DeltaGD;
IBD = IBS + DeltaBD;
```

F I G . 1 6

```
//IRS, IGS, IBS ARE INPUTTED, AND IRD, IGD, IBD ARE OUTPUTTED.
//IT IS SUPPOSED THAT GetRSR( ), GetRSG( ), GetRSB( ), GetGSR( ), GetGSG( ),
//GetGSB( ), GetBSR( ), GetBSG( ), GetBSB( ) ARE FUNCTIONS FOR ACQUIRING
//PREDICTED PCS VALUES BY CONVERSION INTO FUNCTION OR LUT WITH THE USE OF
//PARAMETER OF DEVICE CHARACTERISTIC DATA, AND THEY ARE SEPARATELY DEFINED.

//CALCULATION OF PREDICTED PCS VALUES (PredRS, PredGS, PredBS)
    PredRS = GetRSR(IRS) + GetRSG(IGS) + GetRSB(IBS);
    PredGS = GetGSR(IRS) + GetGSG(IGS) + GetGSB(IBS);
    PredBS = GetBSR(IRS) + GetBSG(IGS) + GetBSB(IBS);

//ALL CALCULATIONS AFTERWARD ARE OMITTED, AND ONLY THE RESULT IS PUT
    //TOGHETER TO THE CALCULATION OF DEVICE R,G,B INTENSITY.

//CALCULATION OF DEVICE R,G,B INTENSITY
    IRD = 2 * IRS - PredRS;
    IGD = 2 * IGS - PredGS;
    IBD = 2 * IBS - PredBS;
```

F I G . 1 7

```
//IRS, IGS, IBS ARE INPUTTED, AND IRD, IGD, IBD ARE OUTPUTTED.
//IT IS SUPPOSED THAT GetRSG( ), GetRSB( ), GetGSR( ), GetGSB( ), GetBSR( ),
//GetBSG( ) ARE FUNCTIONS FOR ACQUIRING PREDICTED PCS VALUES BY CONVERSION
//INTO FUNCTION OR LUT WITH THE USE OF PARAMETER OF DEVICE CHARACTERISTIC
//DATA, AND THEY ARE SEPARATELY DEFINED.

//ALL CALCULATIONS ARE OMITTED, AND ONLY THE RESULT IS PUT TOGHETER
    //TO THE CALCULATION OF DEVICE R,G,B INTENSITY.

//CALCULATION OF DEVICE R,G,B INTENSITY
    IRD = IRS -  GetRSG(IGS) - GetRSB(IBS);
    IGD = IGS -  GetGSR(IRS) - GetGSB(IBS);
    IBD = IBS -  GetBSR(IRS) - GetBSB(IGS);
```

IMAGE PROCESSING APPARATUS, IMAGE PROCESSING METHOD, IMAGE OUTPUT APPARATUS, AND IMAGE PROCESSING SYSTEM

BACKGROUND OF THE INVENTION

1. Field of the Invention

The present invention relates to an image processing apparatus, an image processing method, an image output apparatus, and an image processing system.

2. Description of the Background Art

An output device such as a printer or display has a color space different from that of an input device such as a digital camera or scanner. Therefore, it is necessary to convert once the color space into a certain color space in order to combine the color spaces to each other. In general, the color space (inputted image) of the input device is once converted into a certain standard color space, and the converted standard color space is re-converted into the color space of the output device. By virtue of this operation, a correct color coordinate conversion can be performed even if an output device and input device, each having a different color space, are optionally combined.

The International Color Consortium (ICC) standardizes a Profile format and the like describing the conversion method or characteristic for each of input and output devices for the aforesaid color coordinate conversion. For example, there is ICC. 1: 2004-10 in the standard. According to this, the standard color space is a connection space of Profile, and is defined as PCS (Profile Connection Space). Further, some types of PCS and conversion techniques are also defined.

A conversion technique easy to be generally understood will be explained. First, an inputted image (for example, RGB values) is γ-converted to calculate the primary-color intensities IR, IG, and IB that are linear values. Then, supposing that the PCS is CIE-XYZ (hereinafter sometimes referred to as X, Y, Z) that is tristimulus value of the visibility, the primary-color intensities IR, IG, and IB are converted into X, Y, and Z by the coordinate conversion. In case where the color space of the output device is represented by CMY values, the values of PCS (X, Y, Z) are coordinate-converted into the CMY space. The coordinate of the CMY space is then subjected to reverse γ-conversion to obtain the control value of the output device.

The above is the basis of a color matching. However, in general devices, the γ-curve or the like has a non-linear characteristic, whereby sufficient characteristic cannot be obtained only by the above-mentioned conversion technique in most cases.

Therefore, it is necessary to employ, for example, a technique in which a γ-value is differed for every RGB or CMY, or a technique of using an LUT (look-up table) in the γ-conversion or reverse γ-conversion. The LUT processing in the γ-conversion or reverse γ-conversion dose not entail so large a problem, but the processing using the LUT for the coordinate conversion of the color space involves many dimensions, thereby entailing a problem of a memory usage. For example, in order to obtain output information of a certain color space of 24-bit color (3 byte) for the PCS of 24-bit color (3 byte), the storage capacity of about 50 Mbytes is required for the LUT. There is a method in which the data in the LUT is thinned out and the portion having no value is calculated by interpolation. However, since there is a trade-off relationship between the conversion precision and magnitude of the capacity, there is a limit to the reduction of storage capacity of the LUT.

On the other hand, when the output device is focused, the processing speed of the coordinate conversion does not matter so much if the output device is a printer. This is because, when the output device is a printer, the coordinate conversion operation can be done by a PC (personal computer), and hence, the above-mentioned full-size LUT can easily be used. However, since the printer itself has a reading device for a non-volatile storage medium, and the operation of the coordinate conversion is required to be executed in the printer in recent years, it is difficult to install the full-size LUT to the printer itself. Therefore, another technique should necessarily be tried.

In case where the output device is a display device (display), a display of a moving image is required. Therefore, real-time processing is needed. Accordingly, the display device needs an algorithm of a color coordinate conversion that can be processed with high speed, and the processing that does not impose load on a system such as PC is desirable. Consequently, in case where the output device is a display device (display), the capacity of the LUT is limited, and a new technique is required. When the display device is an LCD (liquid crystal display device), in particular, the γ-curve is different for every RGB. Therefore, the processing of the LCD such as the color coordinate conversion and the like, is improved by techniques disclosed in Japanese Patent Application Laid-Open Nos. 2001-312254 or 2002-116750.

In case where the output device is a display device, the processing of the color coordinate conversion executed by the display device, high speed and low storage capacity are required. In case where the display device is an LCD whose optical characteristic has distortion, in particular, the techniques disclosed in Japanese Patent Application Laid-Open Nos. 2001-312254 or 2002-116750 executes processing in such a manner that the γ-characteristic differs for every RGB. However, in the techniques disclosed in the above-mentioned applications, the conversion precision is insufficient compared to the case of the processing using full-size LUT. Specifically, since not only Y value of RGB is different, but also X value, Y value and Z value are different from one another in the LCD, nine γ-curves are needed. Further, in a TN (twisted nematic) LCD, each of γ-curves cannot be represented by a simple function such as γ-power, and an inflection point may be existed. Therefore, a simple color coordinate conversion with high precision is not easy even by using the techniques disclosed in the above-mentioned applications.

SUMMARY OF THE INVENTION

The present invention aims to provide a high-speed image processing apparatus and image processing method with low storage capacity, capable of performing a simple color coordinate conversion with high precision, in an output device in which γ-curves of tristimulus value XYZ for each of controllable primary colors, such as RGB, are different from one another.

The present invention is an image processing apparatus provided with a storage section, a predicted output value calculating section, an error calculating section, a differential coefficient matrix creating section, an inverse matrix calculating section, a primary-color intensity correction amount calculating section, and a primary-color intensity correction section. The storage section holds characteristic data for acquiring a coordinate in a predetermined designated color space from a controllable primary-color intensity in an output device outputting an image. The predicted output value calculating section calculates a predicted coordinate in the predetermined designated color space from a temporal primary-color intensity by using the characteristic data held at the storage section. The error calculating section calculates an error from a difference between the coordinate to be outputted in the predetermined designated color space and the predicted coordinate. The differential coefficient matrix creating section calculates a partial differential coefficient of the predicted coordinate value at the temporal primary-color intensity, and arranges the calculated partial differential coefficient into a square matrix to create a differential coefficient matrix, by using the characteristic data held in the storage section. The inverse matrix calculating section calculates an inverse matrix of the differential coefficient matrix calculated at the differential coefficient matrix creating section. The primary-color intensity correction amount calculating section calculates a corrected primary-color intensity by performing a primary conversion to the difference between the coordinate to be outputted and the predicted coordinate with the inverse matrix defined as a conversion matrix. The primary-color intensity correction section calculates an output primary-color intensity by adding or subtracting to or from the temporal primary-color intensity the corrected primary-color intensity calculated at the primary-color intensity correction amount calculating section.

Since the image processing apparatus according to the present invention is provided with the storage section, the predicted output value calculating section, the error calculating section, the differential coefficient matrix creating section, the inverse matrix calculating section, the primary-color intensity correction amount calculating section, and the primary-color intensity correction section, a desired color coordinate can be outputted with high precision even to an output device having complicated optical characteristics, and a simple color coordinate conversion can be executed. Further, since the image processing apparatus according to the present invention does not need a large-capacity LUT or complicated processing, the high-speed image processing apparatus with reduced storage capacity can be provided.

The present invention is an image processing method provided with a predicted output value calculating step, an error calculating step, a differential coefficient matrix creating step, an inverse matrix calculating step, a primary-color intensity correction amount calculating step, and a primary-color intensity correction step. The predicted output value calculating step calculates a predicted coordinate in a predetermined designated color space from a temporal primary-color intensity by using characteristic data for acquiring the coordinate in the predetermined designated color space from a controllable primary-color intensity in an output device outputting an image. The error calculating step calculates an error from a difference between the coordinate to be outputted in the predetermined designated color space and the predicted coordinate. The differential coefficient matrix creating step calculates a partial differential coefficient of the predicted coordinate value at the temporal primary-color intensity, and arranges the calculated partial differential coefficient into a square matrix to create a differential coefficient matrix, by using the characteristic data. The inverse matrix calculating step calculates an inverse matrix of the differential coefficient matrix calculated at the differential coefficient matrix creating step. The primary-color intensity correction amount calculating step calculates a corrected primary-color intensity by performing a primary conversion to the difference between the coordinate to be outputted and the predicted coordinate with the inverse matrix defined as a conversion matrix. The primary-color intensity correction step calculates an output primary-color intensity by adding or subtracting to or from the temporal primary-color intensity the corrected primary-color intensity calculated at the primary-color intensity correction amount calculating step.

According to the image processing method according to the present invention, a desired color coordinate can be outputted with high precision even to an output device having a complicated optical characteristic such as an LCD of TN mode, and a simple color coordinate conversion can be executed. Further, since the image processing method according to the present invention does not need a large-capacity LUT or complicated processing, the high-speed image processing method with reduced storage capacity can be provided.

These and other objects, features, aspects and advantages of the present invention will become more apparent from the following detailed description of the present invention when taken in conjunction with the accompanying drawings.

BRIEF DESCRIPTION OF THE DRAWINGS

FIG. 1 is a block diagram for explaining a color matching;

FIG. 7 is a view showing a source code of the image processing according to the embodiment 1 of the present invention;

FIG. 8 is a view showing numerical values used in the source code of the image processing according to the embodiment 1 of the present invention;

FIG. 9 is a view showing a source code of the image processing according to the embodiment 1 of the present invention;

FIG. 10 is a view showing a source code of the image processing according to the embodiment 1 of the present invention;

FIG. 11 is a view for explaining the result of the image processing according to the embodiment 1 of the present invention;

FIG. 12 is a view showing numerical values used for a reverse γ-conversion in the image processing according to the embodiment 1 of the present invention;

FIG. 15 is a view showing a source code of an image processing according to an embodiment 5 of the present invention;

FIG. 16 is a view showing a source code of the image processing according to the embodiment 5 of the present invention; and FIG. 17 is a view showing a source code of the image processing according to the embodiment 5 of the present invention.

DESCRIPTION OF THE PREFERRED EMBODIMENTS

Embodiment 1

Figure 2A:
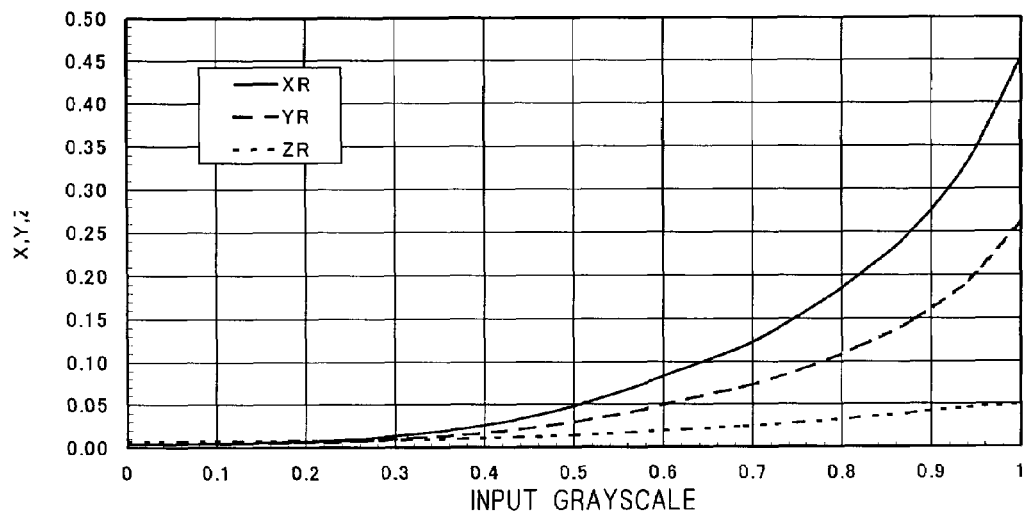
FIGS. 2A, 2B, and 2C are graphs each showing an output characteristic of an output device.

A general method for performing a color matching between an output device and an input device will be explained with reference to a block diagram shown in FIG. 1. An input image inputted from an input device 1 is γ-converted at a γ-conversion section 2 to obtain each of primary-color intensities that are linear values. Specifically, when the input image is represented by RGB value, the primary-color intensities IR, IG, and IB shown in the following equation 1 are obtained by the γ-conversion.

$$\begin{pmatrix} IR \\ IG \\ IB \end{pmatrix} = \begin{pmatrix} R^{\gamma_{in}} \\ G^{\gamma_{in}} \\ B^{\gamma_{in}} \end{pmatrix}$$ [Equation 1]

Subsequently, when CIE-XYZ is adopted as PCS, the outputs (IR, IG, IB) from the γ-conversion section 2 are converted at a first coordinate conversion section 3 to obtain X, Y and Z shown in an equation 2.

$$\begin{pmatrix} X \\ Y \\ Z \end{pmatrix} = \begin{pmatrix} X_{IR} & X_{IR} & X_{IB} \\ Y_{IR} & Y_{IG} & Y_{IB} \\ Z_{IR} & Z_{IG} & Z_{IB} \end{pmatrix} \begin{pmatrix} IR \\ IG \\ IB \end{pmatrix}$$ [Equation 2]

When the color space at an output device 6 is represented by CMY value, the values (X, Y, Z) of PCS are coordinate-converted into a color space of CMY at a second coordinate conversion section 4, as shown in an equation 3.

$$\begin{pmatrix} IC \\ IM \\ IY \end{pmatrix} = \begin{pmatrix} IC_X & IC_Y & IC_Z \\ IM_X & IM_Y & IM_Z \\ IY_X & IY_Y & IY_Z \end{pmatrix} \begin{pmatrix} X \\ Y \\ Z \end{pmatrix}$$ [Equation 3]

Next, the values (IC, IM, IY) obtained from the equation 3 are converted at a reverse γ-conversion section 5 to obtain values (C, M, Y) that can be outputted from the output device 6. The conversion at the reverse γ-conversion section 5 is represented by an equation 4.

$$\begin{pmatrix} C \\ M \\ Y \end{pmatrix} = \begin{pmatrix} IC^{\frac{1}{\gamma_{out}}} \\ IM^{\frac{1}{\gamma_{out}}} \\ IY^{\frac{1}{\gamma_{out}}} \end{pmatrix}$$ [Equation 4]

The above is the basis of the color matching. In FIG. 1, the image data is represented by an input color space (for example, RGB) from the input from the input device 1 to the first coordinate conversion section 3, represented by a PCS color space (for example, XYZ) from the output from the first coordinate conversion section 3 to the input to the second coordinate conversion section 4, and represented by an output color space (for example, CMY) from the output from the second coordinate conversion section 4 to the output device 6.

Figure 2B:
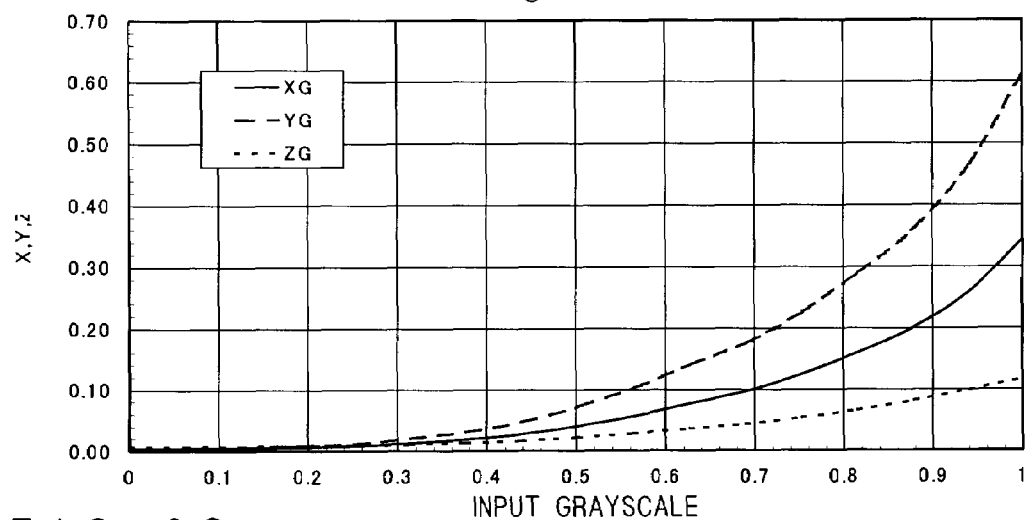
Figure 2C:
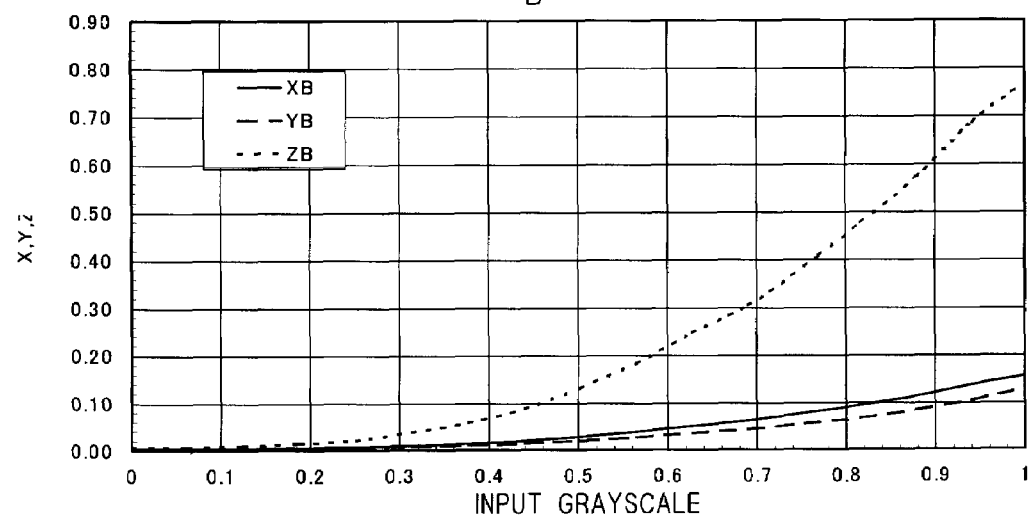

However, when an LCD whose optical characteristic has a distortion is employed as the output device 6, the conversion equations shown in the equations 2 and 3 are not so simple. In the case of TFT-LCD in TN-mode, actual measurement values at the time when the image of RGB is inputted are firstly measured. FIGS. 2A, 2B and 2C show grayscale characteristics of XYZ values measured for every RGB. In FIGS. 2A, 2B and 2C, the abscissa axis represents the input grayscale (standardized to a maximum of 1) of RGB, while the ordinate axis represents the XYZ value for every RGB, which is standardized with the Y-value (that is, Y-value for white) at the time when the input is made such that R, G, B=1, 1, 1 defined as 1. FIG. 2A represents the XYZ characteristic of R, FIG. 2B represents the XYZ characteristic of G, and FIG. 2C represents the XYZ characteristic of Z.

Figure 3A:
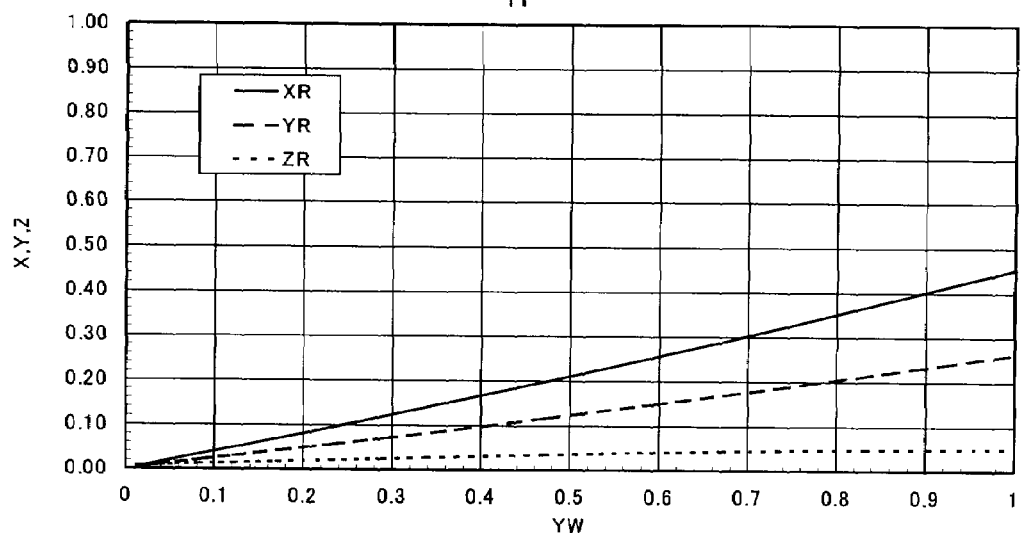
FIGS. 3A, 3B, and 3C are graphs each showing an output characteristic of an output device.
Figure 3B:
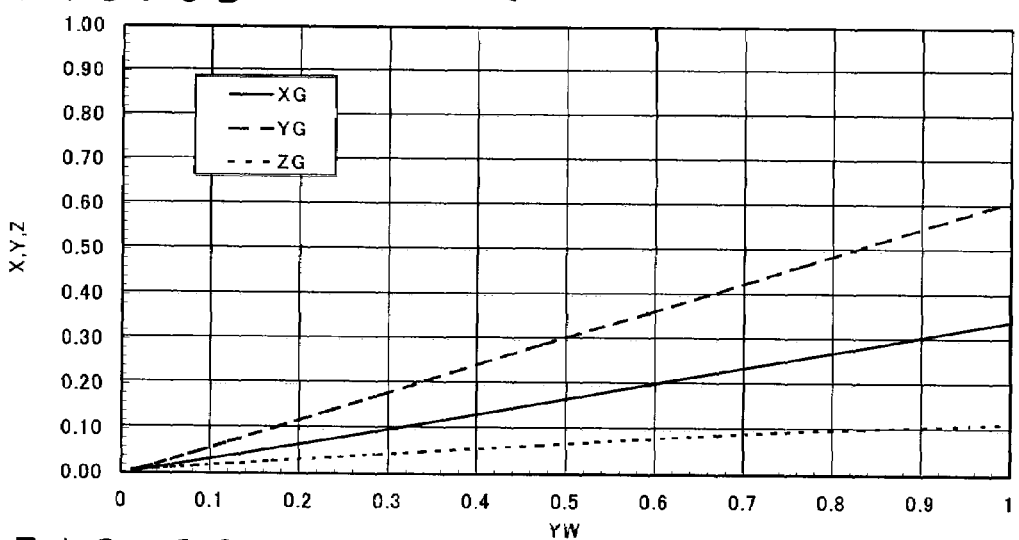
Figure 3C:
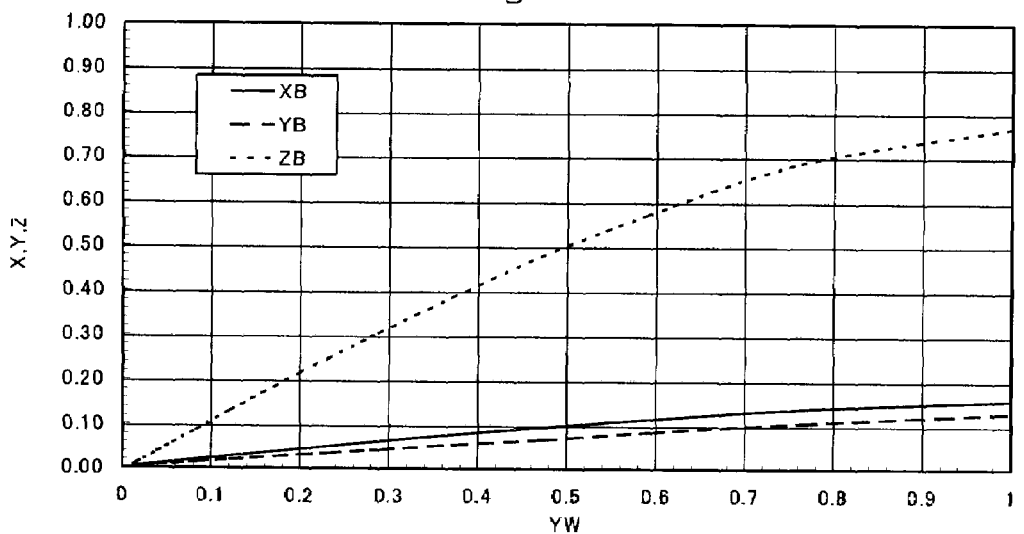

FIGS. 3A, 3B and 3C show each graph in which the abscissa axis shown in each graph in FIGS. 2A, 2B and 2C is changed to characteristic of Y (YR+YG+YB) of a white grayscale used for a general γ value. The abscissa axis in FIGS. 3A, 3B and 3C is standardized with the maximum value of the Y-characteristic defined as 1. FIG. 3A shows the XYZ characteristic of R, FIG. 3B shows the XYZ characteristic of G, and FIG. 3C shows the XYZ characteristic of B.

Figure 4A:
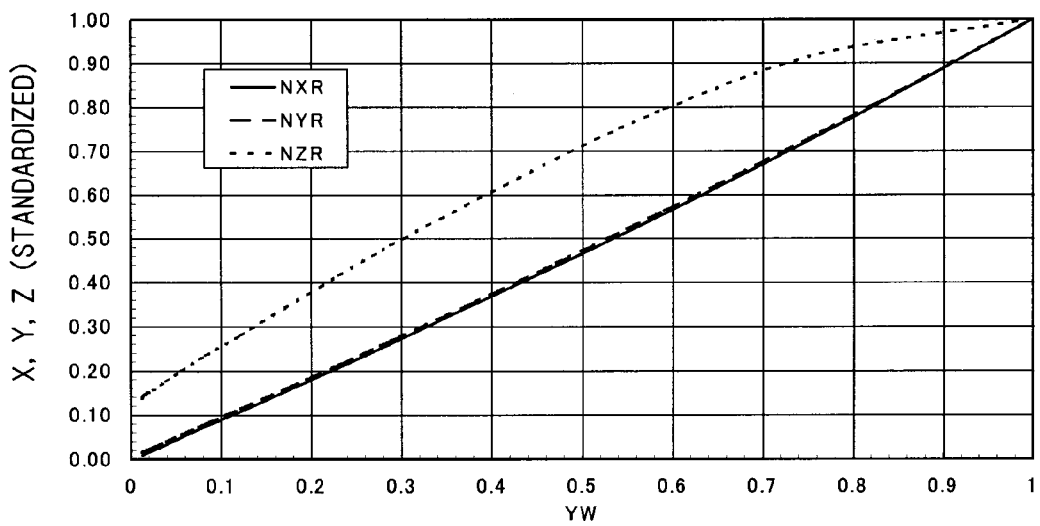
FIGS. 4A, 4B, and 4C are graphs each showing an output characteristic of an output device.
Figure 4B:
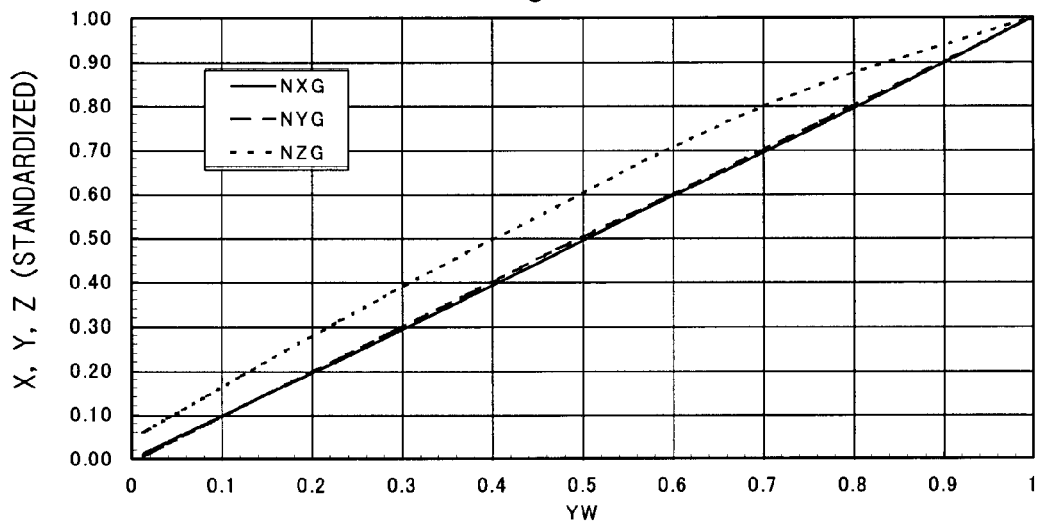
Figure 4C:
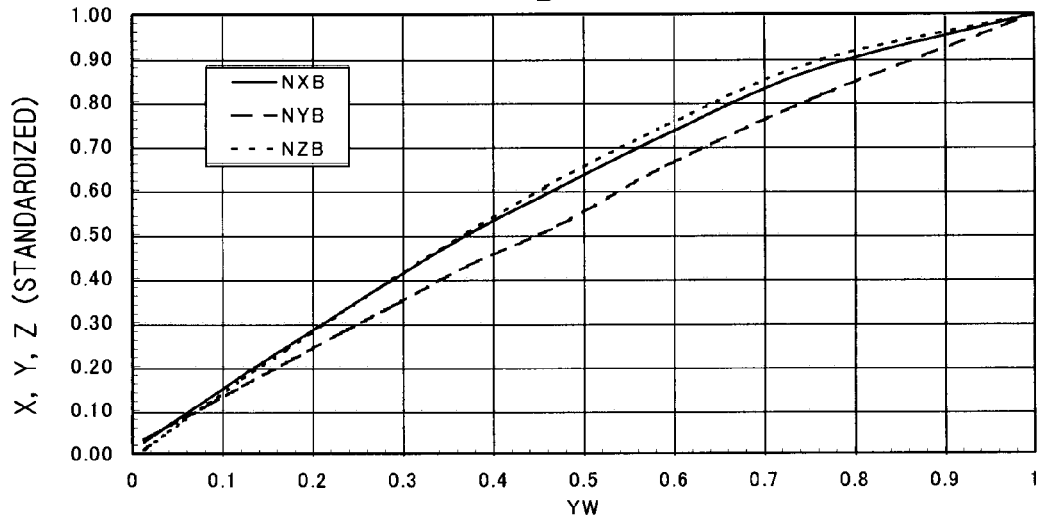

FIGS. 4A, 4B and 4C show that the ordinate axis in FIGS. 3A, 3B and 3C is standardized with the maximum value of the XYZ characteristic for every RGB defined as 1. FIG. 4A shows the XYZ characteristic of R, FIG. 4B shows the XYZ characteristic of G, and FIG. 4C shows the XYZ characteristic of B.

If each characteristic shown in FIGS. 4A, 4B and 4C shows a straight line intersecting the origin with a slope of 1, a simple primary conversion represented by the equation 3 may be utilized in order to acquire the RGB primary-color intensity which should be outputted, from the given desired XYZ values. However, in case where an LCD whose optical characteristic has a distortion as in this embodiment is employed as an output device, the result obtained after the conversion is deviated from the desired values, if the simple primary conversion represented by the equation 3 is utilized. In this case, the characteristics of FIGS. 4A, 4B and 4C may be approximated by some function $(X_R(R), Y_R(R) \ldots Z_B(B))$ in a polynomial or the like to obtain a relation shown in an equation 5, and the RGB primary-color intensity may be calculated backward from the given PCS values (X, Y, Z).

$$\begin{pmatrix} X \\ Y \\ Z \end{pmatrix} = \begin{pmatrix} X_R(R) + X_G(G) + X_B(B) \\ Y_R(R) + Y_G(G) + Y_B(B) \\ Z_R(R) + Z_G(G) + Z_B(B) \end{pmatrix}$$ [Equation 5]

However, if the equation 5 is a second order equation, it is a quadratic simultaneous equation with three unknowns, so that it cannot easily be solved algebraically. Further, if the approximate function is cubic or a higher-order function or other functions, there is no actual algebraic solution. Therefore, in the present embodiment, an image processing such as a color coordinate conversion or the like is performed by using a method described below.

Figure 5:
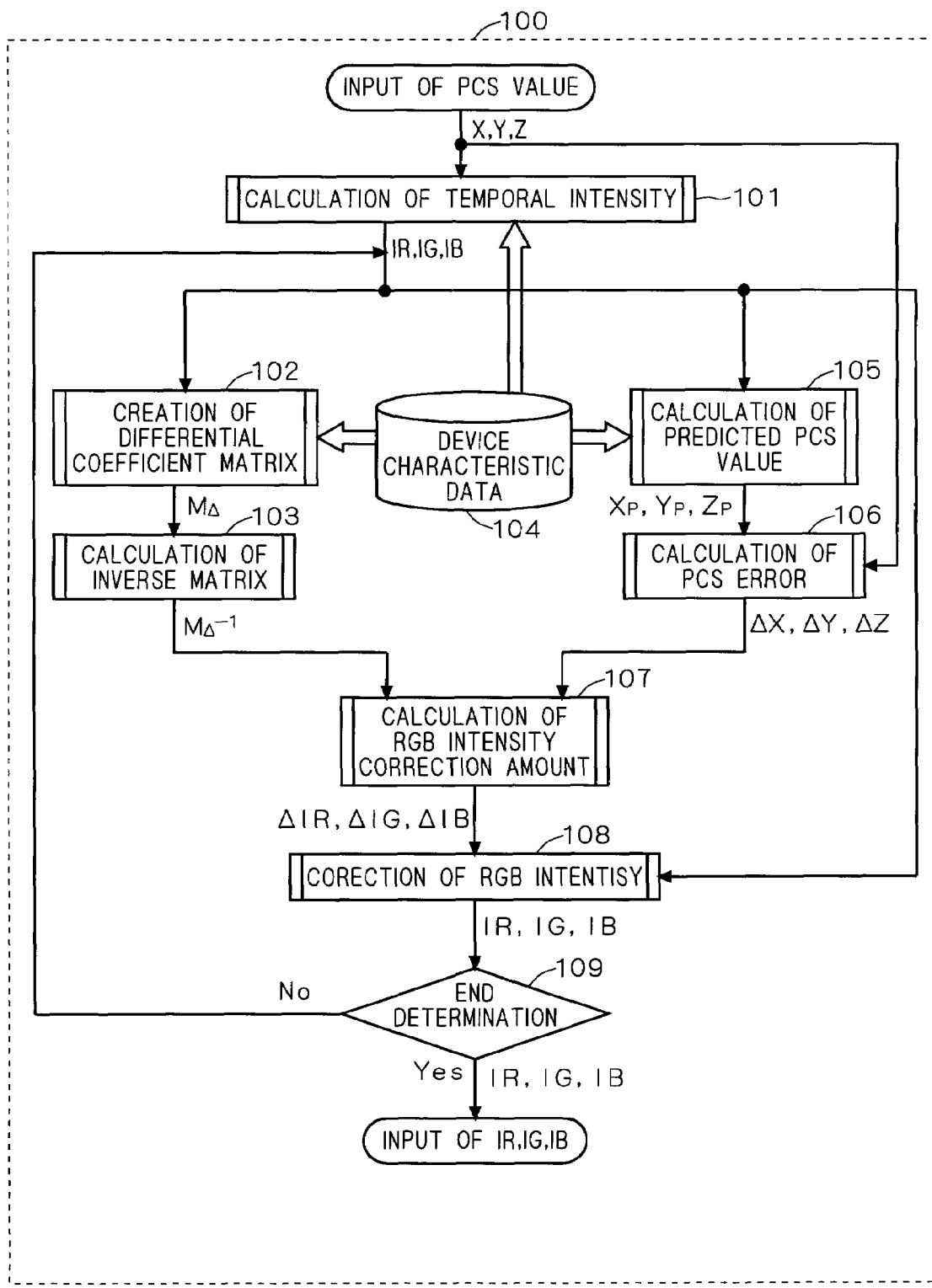
FIG. 5 is a flowchart of an image processing method according to an embodiment 1 of the present invention.

First, a flowchart of an image processing method according to the present embodiment is shown in FIG. 5. The image processing 100 shown in FIG. 5 corresponds to the processing at the second coordinate conversion section 4 in the block diagram shown in FIG. 1. In FIG. 1, a reverse γ-conversion section 5 for associating the RGB primary-color intensity used at the second coordinate conversion section 4 with the values (for example, values that designate applied voltage for obtaining desired transmittance in the case of LCD) for controlling RGB at the output device 6 is provided after the second coordinate conversion section 4.

Subsequently, the image processing at the second coordinate conversion section 4 will specifically be explained with reference to FIG. 5. First, the values of PCS (X, Y, Z) are inputted to the temporal intensity calculating step 101 at the image processing 100. At the temporal intensity calculating step 101, temporal RGB primary-color intensities (IR, IG, IB) are calculated by using device characteristic data retained at the storage section 104. The device characteristic data retained at the storage section 104 is data obtained by converting the above-described actual measurement data shown in FIG. 2 into a predetermined format.

At the temporal intensity calculating step 101, the temporal RGB primary-color intensities are calculated by performing a simple primary conversion represented by an equation 6 similar to the equation 3.

$$\begin{pmatrix} IR \\ IG \\ IB \end{pmatrix} = \begin{pmatrix} IR_X & IR_Y & IR_Z \\ IG_X & IG_Y & IG_Z \\ IB_X & IB_Y & IB_Z \end{pmatrix} \begin{pmatrix} X \\ Y \\ Z \end{pmatrix}$$ [Equation 6]

The conversion matrix of 3×3 used in the equation 6 is created on the basis of the device characteristic data retained at the storage section 104. Specifically, the conversion matrix of 3×3 is formed in such a manner that the XYZ values at the time when the maximum value of each of RGB is displayed are arranged in a matrix and its inverse matrix is taken (equation 7)

$$\begin{pmatrix} IR_X & IR_Y & IR_Z \\ IG_X & IG_Y & IG_Z \\ IB_X & IB_Y & IB_Z \end{pmatrix} = \begin{pmatrix} X_R & X_G & X_B \\ Y_R & Y_G & Y_B \\ Z_R & Z_G & Z_B \end{pmatrix}^{-1}$$ [Equation 7]

The obtained temporal RGB primary-color intensities (IR, IG, IB) are inputted in parallel to a predicted PCS value calculating step 105 and a differential coefficient matrix creating step 102.

At the predicted PCS value calculating step 105, the XYZ value (coordinate to which they should be outputted) displayed by the output device in case where the temporal RGB primary-color intensities are inputted is calculated. The characteristic data used upon this calculation is retained as device characteristic data at the storage section 104, and it is characteristic data obtained from the graph shown in FIG. 3. Specifically, there are roughly two formats in the device characteristic data retained at the storage section 104, one of which is a format using an LUT, and the other one of which is a format of a conversion into a function.

In the format using an LUT, the XYZ values for some discrete RGB primary-color intensities are retained as the device characteristic data, and a technique such as a linear interpolation or nth-degree spline interpolation is used for the RGB primary-color intensities that are not stored. On the other hand, in the method using a function, a certain function is defined, and only the parameter used in the defined function is retained as the device characteristic data.

For example, the characteristic data of LCD can be represented by about cubic function, if it is a polynomial of a+bx+cx²+dx³ with x defined as a variable. Therefore, it is desirable that, in the device characteristic data retained at the storage section 104, the polynomial is converted into a function, if the number of parameters (storage capacity) has priority. The conversion of polynomial by a function is also useful in the later-described differential coefficient.

When the operation for acquiring the XYZ values for every RGB from the device characteristic data at the storage section 104 is described as $X_R(IR), \ldots, Z_B(IB)$, the calculation at the predicted PCS value calculating step 105 can be expressed by an equation 8.

$$\begin{pmatrix} X_P \\ Y_P \\ Z_P \end{pmatrix} = \begin{pmatrix} X_R(IR) + X_G(IG) + X_B(IB) \\ Y_R(IR) + Y_G(IG) + Y_B(IB) \\ Z_R(IR) + Z_G(IG) + Z_B(IB) \end{pmatrix}$$ [Equation 8]

$X_P$, $Y_P$, $Z_P$ shown in the equation 8 are the XYZ values (predicted PCS values (predicted coordinate)) predicted in case where the temporal RGB primary-color intensities IR, IG, IB are outputted to the output device. When $X_R(IR), \ldots, Z_B(IB)$ used at the right side in the equation 8 is used at the right side in the equation 7, an equation 9 is obtained.

$$\begin{pmatrix} X_R & X_G & X_B \\ Y_R & Y_G & Y_B \\ Z_R & Z_G & Z_B \end{pmatrix} = \begin{pmatrix} X_R(1) & X_G(1) & X_B(1) \\ Y_R(1) & Y_G(1) & Y_B(1) \\ Z_R(1) & Z_G(1) & Z_B(1) \end{pmatrix}$$ [Equation 9]

It is to be noted that the right side in the equation 9 indicates the maximum intensities obtained by the substitution of 1 into the function.

Subsequently, the predicted PCS values ($X_P$, $Y_P$, $Z_P$) obtained from the equation 8 are inputted to a PCS error calculating step 106. The PCS error calculating step 106 calculates how much the predicted PCS values ($X_P$, $Y_P$, $Z_P$) are shifted from the XYZ values inputted to the temporal intensity calculating step 101. Specifically, the PCS error calculating step 106 performs the calculation of an equation 10.

$$\begin{pmatrix} \Delta X \\ \Delta Y \\ \Delta Z \end{pmatrix} = \begin{pmatrix} X - X_P \\ Y - Y_P \\ Z - Z_P \end{pmatrix}$$ [Equation 10]

On the other hand, the temporal RGB primary-color intensities (IR, IG, IB) are also inputted to the differential coefficient matrix creating step 102. The differential coefficient matrix creating step 102 obtains a partial differential coefficient in the vicinity of each of XYZ values for every RGB on the basis of the device characteristic data in the storage section 104, when the display is made with the temporal RGB primary-color intensities (IR, IG, IB). Obtaining the partial differential coefficient is, in other words, to acquire the slope in each XYZ characteristic shown in FIG. 3 when the abscissa axis is defined as the temporal RGB primary-color intensities (IR, IG, IB).

Similarly to the predicted PCS value calculating step 105, the device characteristic data retained at the storage section 104 is utilized in the format using an LUT or in the format using a function in the differential coefficient matrix creating step 102. In the format using an LUT, there are two methods; a method in which the partial differential coefficient itself calculated beforehand is inputted to a table, and a method in which a rate of change of the XYZ values for the RGB primary-color intensities stored in the table in the vicinity of IR, IG, and IB is calculated. For example, when the partial differential coefficient of the XYZ values for the discrete RGB primary-color intensities is acquired, the obtained slope may be used as unchanged in the case of the linear approximation.

In the format of the conversion into a function, if the function takes a function type that is algebraically difficult to be differentiated, the partial differential coefficient may be obtained from the difference of IR and IR+Δ (Δ is a trace amount) from the XYZ values (the same is true for IG and IB). In the case of the polynomial, it is easy to obtain the differential coefficient, so that the partial differential coefficient can be calculated by algebraically differentiating the approximated polynomial. If the operation for acquiring the partial differential coefficient of XYZ values for every RGB is described as $dX_R(IR), \ldots, d_ZB(IB)$ on the basis of the device characteristic data in the storage section 104 in both formats, the differential coefficient matrix creating step 102 creates a matrix $M_\Delta$ of an equation 11.

$$M\Delta = \begin{pmatrix} dX_R(IR) & dX_G(IG) & dX_B(IB) \\ dY_R(IR) & dY_G(IG) & dY_B(IB) \\ dZ_R(IR) & dZ_G(IG) & dZ_B(IB) \end{pmatrix} \quad \text{[Equation 11]}$$

The obtained $M_\Delta$ matrix is inputted to the inverse matrix calculating step 103. At the inverse matrix calculating step 103, the inverse matrix $M_\Delta^{-1}$ of $M_\Delta$ matrix is obtained. The physical meaning of each element of the inverse matrix $M_\Delta^{-1}$ is such that, when the XYZ values slightly changes in case where the XYZ values are displayed as IR, IG, and IB, each element of the inverse matrix $M_\Delta^{-1}$ indicates how much IR, IG, and IB change (how much IR, IG, and IB should be changed). The aforesaid case is represented by an equation 12.

$$M_\Delta^{-1} = \begin{pmatrix} \frac{\partial IR}{\partial X} & \frac{\partial IR}{\partial Y} & \frac{\partial IR}{\partial Z} \\ \frac{\partial IG}{\partial X} & \frac{\partial IG}{\partial Y} & \frac{\partial IG}{\partial Z} \\ \frac{\partial IB}{\partial X} & \frac{\partial IB}{\partial Y} & \frac{\partial IB}{\partial Z} \end{pmatrix} \quad \text{[Equation 12]}$$

Next, in an RGB primary-color intensity correction amount calculating step 107, the inverse matrix $M_\Delta^{-1}$ from the inverse matrix calculating step 103 and $\Delta X$, $\Delta Y$, and $\Delta Z$ from the PCS error calculating step 106 are multiplied to calculate $\Delta IR$, $\Delta IG$, and $\Delta IB$ as in an equation 13.

$$\begin{pmatrix} \Delta IR \\ \Delta IG \\ \Delta IB \end{pmatrix} = M_\Delta^{-1} \begin{pmatrix} \Delta X \\ \Delta Y \\ \Delta Z \end{pmatrix} = \begin{pmatrix} \frac{\partial IR}{\partial X} & \frac{\partial IR}{\partial Y} & \frac{\partial IR}{\partial Z} \\ \frac{\partial IG}{\partial X} & \frac{\partial IG}{\partial Y} & \frac{\partial IG}{\partial Z} \\ \frac{\partial IB}{\partial X} & \frac{\partial IB}{\partial Y} & \frac{\partial IB}{\partial Z} \end{pmatrix} \begin{pmatrix} \Delta X \\ \Delta Y \\ \Delta Z \end{pmatrix} \quad \text{[Equation 13]}$$

Next, in the RGB primary-color intensity correction step 108, $\Delta IR$, $\Delta IG$, and $\Delta IB$ obtained in the RGB primary-color intensity correction amount calculating step 107 are added to the temporal RGB primary-color intensities (IR, IG, IB) so as to obtain new RGB primary-color intensities as shown in an equation 14.

$$\begin{pmatrix} \Delta IR \\ \Delta IG \\ \Delta IB \end{pmatrix} \Leftarrow \begin{pmatrix} IR + \Delta IR \\ IG + \Delta IG \\ IB + \Delta IB \end{pmatrix} \quad \text{[Equation 14]}$$

Next, an end determination step 109 determines whether or not a series of processings such as the differential coefficient matrix creating step 102, the predicted PCS value calculating step 105, and the like are to be repeated. When the processings are to be repeated, the new RGB primary-color intensities obtained in the RGB primary-color intensity correction step 108 are used as the temporal RGB primary-color intensities (IR, IG, IB), and the same processings are performed. When the processings are ended, the new RGB primary-color intensities are employed as the RGB primary-color intensities that should be outputted, and they are outputted to the reverse γ-conversion section 5 shown in FIG. 1. Thus, the processings are ended.

The reason why the end determination step 109 is provided and the same processings are repeated is that, by performing the processings shown in FIG. 5 only once, the target color coordinate conversion precision might not be achieved. Therefore, the processings shown in FIG. 5 are performed again, whereby the conversion precision at least higher than that of the RGB primary-color intensities obtained from the equation 6 may be achieved. Specifically, for usages where a high-precision color matching is required, the high-precision color matching can be realized by repeating the processings shown in FIG. 5 plural times.

FIG. 5 is explained as the flowchart of an image processing method according to the present embodiment. However, if it is supposed that this method is executed by a computer, FIG. 5 can be explained as a block diagram for explaining an image processing apparatus according to the present embodiment by replacing the temporal intensity calculating step 101 with a functional block of a temporal intensity calculating section, the differential coefficient matrix creating step 102 with a functional block of a differential coefficient matrix creating section, and the predicted PCS value calculating step 105 with a functional block of a predicted PCS value calculating section, or the like.

Figure 6:
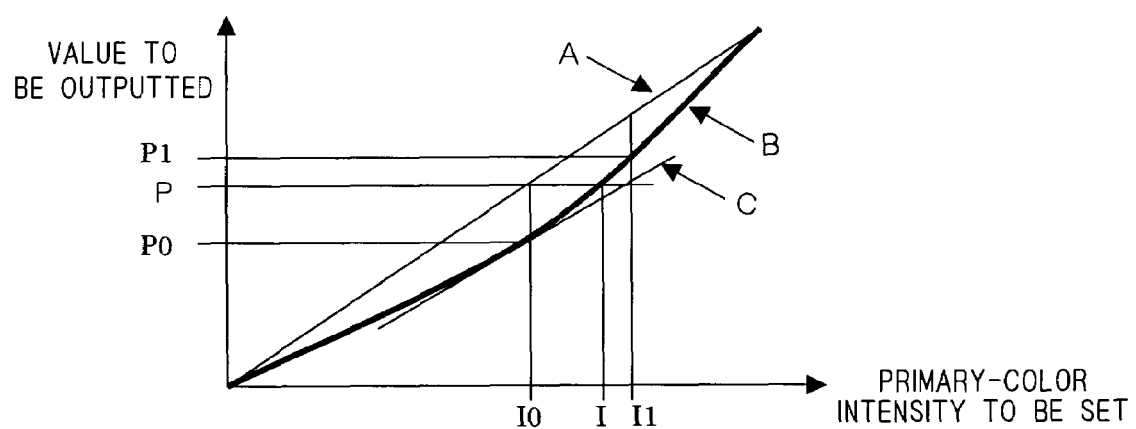
FIG. 6 is a schematic view for explaining the image processing method according to the embodiment 1 of the present invention.

Subsequently, the explanation will be made in more detail by simplifying the three-dimensional color coordinate conversion explained in the aforesaid image processing 100 to a one-dimensional color coordinate conversion. FIG. 6 is a diagram schematically showing the processing of one-dimensional color coordinate conversion. The image processing will be explained with the use of FIG. 6. First, in FIG. 6, the ordinate axis represents the value (for example, Y) that should be outputted, while the abscissa axis represents the primary-color intensity (for example, IR) that should be set. The relationship between the value that should be outputted and the primary-color intensity is ideally linear (ideal characteristic A), but actually, it is curved like characteristic B in FIG. 6. When a desired output value is P, the temporal primary-color intensity is obtained as I0 from the ideal characteristic A, that is, from a linear conversion. However, since the actual characteristic B is curved, the output value for the temporal primary-color intensity I0 obtained from the linear conversion is predicted as P0 as shown in FIG. 6. The slope C in the vicinity of the temporal primary-color intensity I0 is obtained, and a corrected new primary-color intensity I1 is calculated from the slope C and the difference P-P0 of output value. The output value corresponding to the new primary-color intensity I1 is P1. The difference of output value P-P1 becomes smaller than the difference P-P0, so that the output value can be made infinitely close to P by repeating the aforesaid processing.

The processing described above is represented by an equation. When the value outputted when the primary-color intensity I is inputted is represented by f(I), a Taylor expansion in the vicinity of the temporal primary-color intensity I0 is represented by an equation 15.

$$f(I) = f(Io) + f'(Io)(I - Io) + \frac{f''(Io)}{2!}(I - Io)^2 + \ldots \quad \text{[Equation 15]}$$

When the primary-color intensity I for obtaining the desired output value P is calculated by using the equation 15, the equation 15 can be approximated to an equation 16 by neglecting the high-order terms, if the temporal primary-color intensity I0 is close to the primary-color intensity I.

$$P = f(I0) + f'(I0)(I - I0) \quad \text{[Equation 16]}$$

Therefore, an equation 17 is obtained, when the primary-color intensity I is algebraically obtained.

$$I = Io + \frac{1}{f'(Io)}\{P - f(Io)\} \quad \text{[Equation 17]}$$

If the temporal primary-color intensity I0 is not close to the primary-color intensity I, an error is produced in the approximation of the equation 16, and hence, an error is included in the result of the calculation of the equation 17. Therefore, the result of the calculation of the equation 17 that is much closer to the primary-color intensity I is used as the temporal primary-color intensity I0, and the primary-color intensity I is recalculated in the equation 17, whereby the approximation precision in the equation 16 is enhanced, and the temporal primary-color intensity is finally converged to the value of the primary-color intensity I. A series of repeated processings shown in FIG. 5 is a multi-dimensional expansion of the equation 17.

The reason why the equation 16 employs the first-order term is that, if a second-order term or higher-order term is included, the equation 16 becomes a simultaneous equation with many unknowns, which is difficult to be solved. The equation 16 can be easily calculated with a matrix calculation of primary conversion, if the equation 16 includes only a first-order term. Specifically, if the equation 16 is expanded three-dimensionally with the temporal RGB primary-color intensities defined as $IR_O$, $IG_O$, and $IB_O$, the relational equation of the RGB primary-color intensities IR, IG, and IB for the desired PCS values (XYZ values) is as described in an equation 18.

$$\begin{pmatrix} X \\ Y \\ Z \end{pmatrix} = \begin{pmatrix} X_R(IR_O) + X'_R(IR_O)(IR - IR_O) + X_G(IG_O) + X'_G(IG_O)(IG - IG_O) + X_B(IB_O) + X'_B(IB_O)(IB - IB_O) \\ Y_R(IR_O) + Y'_R(IR_O)(IR - IR_O) + Y_G(IG_O) + Y'_G(IG_O)(IG - IG_O) + Y_B(IB_O) + Y'_B(IB_O)(IB - IB_O) \\ Z_R(IR_O) + Z'_R(IR_O)(IR - IR_O) + Z_G(IG_O) + Z'_G(IG_O)(IG - IG_O) + Z_B(IB_O) + Z'_B(IB_O)(IB - IB_O) \end{pmatrix} \quad \text{[Equation 18]}$$

Further, the equation 18 is changed to obtain equations 19 and 20.

$$\begin{pmatrix} X - \{X_R(IR_O) + X_G(IG_O) + X_B(IB_O)\} \\ Y - \{Y_R(IR_O) + Y_G(IG_O) + Y_B(IB_O)\} \\ Z - \{Z_R(IR_O) + Z_G(IG_O) + Z_B(IB_O)\} \end{pmatrix} = \begin{pmatrix} X'_R(IR_O) & X'_G(IG_O) & X'_B(IB_O) \\ Y'_R(IR_O) & Y'_G(IG_O) & Y'_B(IB_O) \\ Z'_R(IR_O) & Z'_G(IG_O) & Z'_B(IB_O) \end{pmatrix} \begin{pmatrix} IR - IR_O \\ IG - IG_O \\ IB - IB_O \end{pmatrix} \quad \text{[Equation 19]}$$

$$\begin{pmatrix} IR \\ IG \\ IB \end{pmatrix} = \begin{pmatrix} IR_O \\ IG_O \\ IB_O \end{pmatrix} + \begin{pmatrix} X'_R(IR_O) & X'_G(IG_O) & X'_B(IB_O) \\ Y'_R(IR_O) & Y'_G(IG_O) & Y'_B(IB_O) \\ Z'_R(IR_O) & Z'_G(IG_O) & Z'_B(IB_O) \end{pmatrix}^{-1} \begin{pmatrix} X - \{X_R(IR_O) + X_G(IG_O) + X_B(IB_O)\} \\ Y - \{Y_R(IR_O) + Y_G(IG_O) + Y_B(IB_O)\} \\ Z - \{Z_R(IR_O) + Z_G(IG_O) + Z_B(IB_O)\} \end{pmatrix} \quad \text{[Equation 20]}$$

The equation 20 corresponds to the one describing a series of calculations shown in the equations 10 to 14 with one line. Specifically, the RGB primary-color intensities (IR, IG, IB) that should be outputted are the values obtained by adding a correction amount to the temporal RGB primary-color intensities ($IR_O$, $IG_O$, $IB_O$). The correction amount is obtained in such a manner that the PCS values predicted from the temporal RGB primary-color intensities are subtracted from the desired PCS set values (X, Y, Z), and a primary conversion is performed with an inverse matrix of the XYZ differential coefficients at the points of the temporal RGB primary-color intensities.

When the desired PCS set values are subtracted from the PCS values predicted from the temporal RGB primary-color intensities upon obtaining the errors of PCS ($\Delta X$, $\Delta Y$, $\Delta Z$), the RGB primary-color intensities (IR, IG, IB) that should be outputted are calculated by subtracting the correction amount from the temporal RGB primary-color intensities. This is apparent from the fact that the sign of the second term is changed (from + to −) by turning over the PCS error calculating portion (the term of X−{ . . . }) in the equation 20. Specifically, the RGB primary-color intensities (IR, IG, IB) that should be outputted are those obtained by subtracting the correction amount from the temporal RGB primary-color intensities ($IR_O$, $IG_O$, $IB_O$). This correction amount is obtained in such a manner that the desired PCS set values (X, Y, Z) are subtracted from the PCS values predicted from the temporal RGB primary-color intensities, and a primary conversion is performed with an inverse matrix of the XYZ differential coefficients at the points of the temporal RGB primary-color intensities.

The operation of the temporal RGB primary-color intensity calculating section 101 shown in FIG. 5 is to reduce the number of times of repeating the processing in the predicted PCS value calculating step 105 or the like. For example, even if the temporal RGB primary-color intensities given at the beginning are fixed to 0, it is considered that the values are converged to the desired values with less number of times of the repetitions if the high-order coefficient of the function is small. However, if the RGB primary-color intensities given at the beginning are values very close to the desired values, the number of times of the repetitions performed until the same precision is achieved is reduced.

Next, there are a method of repeating fixed number of times (for example, three times), or a method in which the obtained RGB primary-color intensities are processed again at the predicted PCS value calculating step 105 and PCS error calculating step 206, and the determination is made with the magnitude of $\Delta X$, $\Delta Y$, and $\Delta Z$ (for example, $\Delta X/X<1\%$), according to the demanded precision, in the determination basis of the end determination 109. In the case of LCD explained in the present embodiment, the difference can be visually recognized in the processed result, when the number of times of performing the processing in FIG. 5 is actually changed to twice from once. However, when the number of times of performing the processing in FIG. 5 is changed to three times from twice, the difference in the processed result can hardly be recognized visually. Specifically, it can be understood that, in the case of LCD explained in the present embodiment, sufficient precision can be provided by repeating the processing shown in FIG. 5 twice.

In case where the processing in FIG. 5 is performed to an output device such as an LCD or the like to which a real-time property is demanded, the aforesaid algorithm may be created in an IC such as ASIC or the like. Considering the real-time property, in particular, the end determination had better be performed fixed number of times. Specifically, if the same blocks are prepared in the IC by the fixed number of times, and serial processing or parallel processing is performed, the real-time property is not deteriorated. Alternatively, if the internal processing speed is sufficiently higher than the inputted frequency of image data, the same calculation is repeated twice with double speed to reduce the blocks (the number of logical gates) for algorithm, for example.

In the present embodiment, the image processing apparatus used for an LCD is explained, in which a black display (all inputs are zero) is not particularly described. However, most of actually existing output devices outputting an image have finite values, since even if they intend to output black, tristimulus value (XYZ) is not perfectly zero due to the physical characteristic of their output system or influence of ambient light. The input of zero of the output device originally demands the output of zero, so that it becomes a coordinate outside the reproducible range of the output device. It does not matter if the output zero capable of being outputted from the output device is very close to zero of tristimulus value. However, if there is some difference, a technique described below had better be employed.

A technique of creating characteristic data of an output device from the measured result of the actual output device will be explained. In the case of the output device outputting black whose tristimulus value is not zero, the measured results $X_M$, $Y_M$, and $Z_M$ are represented by an equation 21.

$$\begin{pmatrix} X_M \\ Y_M \\ Z_M \end{pmatrix} = \begin{pmatrix} X_R(IR) + X_G(IG) + X_B(IB) \\ Y_R(IR) + Y_G(IG) + Y_B(IB) \\ Z_R(IR) + Z_G(IG) + Z_B(IB) \end{pmatrix} + \begin{pmatrix} X_O \\ Y_O \\ Z_O \end{pmatrix} \quad \text{[Equation 21]}$$

In the equation 21, $X_O$, $Y_O$, and $Z_O$ are tristimulus values measured upon outputting black. $X_R(Ir)$, $X_G(Ig)$, ..., $Z_B(Ib)$ are some functions that become zero when black is displayed, that is, when Ir, Ig, Ib=0. Specifically, in order to obtain the functions of $X_R(Ir)$, $X_G(Ig)$, ..., $Z_B(Ib)$ from the measured data, the measured data of black output $(X_O, Y_O, Z_O)$ may be subtracted from the measured data. Accordingly, if the obtained $X_R(Ir)$, $X_G(Ig)$, ..., $Z_B(Ib)$ and $X_O$, $Y_O$, $Z_O$ are retained at the storage section 104 as device characteristic data, the predicted PCS value calculating step 105 have only to perform the calculation of the equation 22.

$$\begin{pmatrix} X_P \\ Y_P \\ Z_P \end{pmatrix} = \begin{pmatrix} X_R(IR) + X_G(IG) + X_B(IB) \\ Y_R(IR) + Y_G(IG) + Y_B(IB) \\ Z_R(IR) + Z_G(IG) + Z_B(IB) \end{pmatrix} + \begin{pmatrix} X_0 \\ Y_0 \\ Z_0 \end{pmatrix} \quad \text{[Equation 22]}$$

Since the difference between the functional type of the equation 22 and the functional type of the equation 8 is only a constant, this difference does not affect the result of the differentiation at the differential coefficient matrix creating step 102. Specifically, the device characteristic data may be created by performing the calculation of the equation 22, instead of the equation 8, with the use of the values obtained by subtracting the measured values $(X_O, Y_O, Z_O)$ of black output. Thus, even in an output device whose black output does not have tristimulus value of zero, a color coordinate required by an input can precisely be outputted. However, there remains a problem that, when an output whose level is lower than black that can be outputted is required by an input, such output cannot physically be outputted by the aforesaid processing. In this case, grayscale expression cannot be done for the input of black in which tristimulus values are all zero to black that can be outputted, that is, a so-called dark-area-gradation deterioration is produced.

Although depending upon the appearance of the outputted result and the demanded specification of the output device, the outputtable black level is low, so that it can simply be regarded as zero, if the contrast ratio of black to white is high. Therefore, the occurrence of dark-area-gradation deterioration can be prevented. In this case, the measured value from which the black values $(X_O, Y_O, Z_O)$ are subtracted is retained at the storage section 104 as device characteristic data, and the equation 8 may be used instead of the equation 22, in the calculation of the predicted PCS values. According to this, the output values after the correction becomes those obtained by adding $X_O$, $Y_O$, and $Z_O$ to the desired PCS values. Since $X_O$, $Y_O$, and $Z_O$ are small, they do not affect very much to the display of the output device, and the occurrence of dark-area-gradation deterioration can be prevented. When a grayscale of black and white is displayed on the LCD illustrated in the present embodiment, the influence of $X_O$, $Y_O$, and $Z_O$ is sufficiently small at the whitish portion, and there is no problem in the calorimetric error values (=difference between set values and actual output/set value) and on the display. However, the result shows that only the calorimetric error values are greatly affected at the portion nearly black. The influence for the visual recognition is small at the dark portion where the influence of the calorimetric error values are great, since this portion is originally dark, and hence, there is no particular sense of incongruity on the output result on the display.

FIG. 7 shows a specific source code. The source code shown in FIG. 7 is written by a syntax of C programming language, wherein a comment is described at the line "//". In FIG. 7, // calculation of temporal primary-color intensity TempR, TemG, TemB corresponds to the temporal intensity calculating step 101, // calculation of predicted PCS value (PredX, PredY, PredZ) corresponds to the predicted PCS value calculating step 105, // PCS error calculation corresponds to the PCS error calculating step 106, // calculation of differential coefficient matrix coefficient corresponds to the differential coefficient matrix creating step 102, // calculation of inverse matrix of differential coefficient corresponds to the inverse matrix calculating step 103, // calculation of R, G, B corrected intensity corresponds to the RGB primary-color intensity correction amount calculating step 107, // correction of R, G, B intensity corresponds to the RGB primary-color intensity correction step 108, and // fixed number of times (twice) loop corresponds to the end determination step 109.

In the source code shown in FIG. 7, the type statement of variable is omitted, and further, description and notation of floating-point and fixed-point are omitted. In the source code shown in FIG. 7, the device characteristic data is approximated to the cubic polynomial, applied as its coefficient. In FIG. 7, the device characteristic data is represented by drawing underlines. Further, in FIG. 7, the processing for preventing the occurrence of dark-area gradation deterioration is introduced, wherein the zeroth-order coefficient in the polynomial is defined as 0, and its description on the code is omitted.

FIG. 8 shows the constant actually used in the source code in FIG. 7. When some PCS values (X, Y, Z) are given to the program shown in FIG. 7, the RGB primary-color intensities TempR, TempG, and TempB to be outputted can finally be obtained. As described above, the image processing method according to the present embodiment can be realized by a simple code.

In case where the device characteristic data is approximated to a polynomial or is subjected to interpolation including extrapolation with second-order or higher-order with the use of an LUT, the curve outside the range (except for 0~1) that each of RGB primary-color intensities assume is an imaginary one. Therefore, the curve outside the range that each of RGB primary-color intensities assume may take an extremum. In the aforesaid image processing method, there may be the case where the temporal RGB primary-color intensities are outside the range in the processing loop performed plural times. When the temporal RGB primary-color intensities are outside the range, the correction value for RGB becomes greater than needed, or the sign thereof may be reversed, so that it might not be capable of being converged to the desired value. Therefore, the processing described below is desirably performed, when the temporal RGB primary-color intensities that are outside the range that can be covered by the RGB primary-color intensities are provided.

Even if the temporal RGB primary-color intensities are outside the range that can be covered by the RGB primary-color intensities, they can be approximately regarded as the same as the differential coefficient in the vicinity of the maximum value or minimum value, if the deviation is small. Therefore, when the temporal RGB primary-color intensities exceed the maximum value (supposing 1) during the process of calculating the predicted PCS values, the PCS differential coefficient having the intensity of 1 may be multiplied to the value obtained by subtracting the intensity of 1 from the given intensity, and then, the PCS value having the intensity of 1 may be added. On the other hand, when the given temporal RGB primary-color intensities are smaller than the minimum value (supposing 0), the PCS differential coefficient having the intensity of 0 may be multiplied to the given intensity, and then, the PCS value having the intensity of 0 may be added.

FIG. 9 specifically shows the source code. The code shown in FIG. 9 is written with a syntax of C programming language, wherein a comment is described on the line "//". In FIG. 9, each of the RGB processings is described. As for the process of creating the differential coefficient matrix, when the temporal RGB primary-color intensities exceed 1, the value at the time when the intensity is 1 may be used, while when the temporal RGB primary-color intensities are smaller than 0, the value at the time when the intensity is 0 may be used. A specific source code is shown in FIG. 10. The code shown in FIG. 10 is written with a syntax of C programming language, wherein a comment is described on the line "//". In FIG. 10, each of the RGB processings is described.

In the present embodiment, the explanation is made such that the RGB primary-color intensities are defined as Y-value of the white grayscale whose maximum value is standardized to 1. However, the present invention is not limited thereto. The standardization may be performed by using different values for every RGB. Notably, when the standardization may be performed by using different values for every RGB, processings different for every RGB are required during the reverse γ-conversion inserted after the image processing, that is, during the conversion to the control value of the output device with respect to the RGB primary-color intensities.

In order to obtain the optimal correction result in the image processing method according to the present embodiment, the scale of the primary-color intensity may be selected so as to make the PCS curve for the primary-color intensity close to a linear shape as much as possible. If the high-order coefficient is small in the approximation of the equation 16, the high-order term becomes small even if the value of I-I0 increases to some degree, whereby the approximate precision is enhanced. Therefore, the number of times of repeating the image processing may be reduced. Specifically, the satisfactory correction result can be obtained by such a manner that the temporal RGB primary-color intensities or RGB primary-color intensities to be outputted are selected so as to achieve a linear shape of tristimulus value measured for every primary color, and the correlation thereof to the control value of the output device is stored at the reverse γ-conversion section.

For example, although the main output values are XYZ, each of XR, YG, and ZB or the value of XR+YR+ZR+XG+YG+ZG+XB+YB+ZB may be selected for each of RGB primary-color intensities. Observing the curves of B in FIG. 4C, the curves are all expanded upwardly. Therefore, all of the curves are made close to be linear by standardizing the Z curve of B in FIG. 4C to the maximum value 1 at the abscissa axis, whereby the number of processing times can be reduced. In order to obtain the greatest effect, a primary-color intensity, in which the square sum of the difference between the straight line linking each of X, Y, and Z at the maximum control value (1) and the origin (0) and the actual characteristic becomes the minimum, may be selected for each of R, G and B. However, when the primary-color intensity selected for every RGB is changed, the number of correlation parameters used in the process of the reverse γ-conversion is increased, so that there arises a trade-off relationship between the processing amount and the storage capacity. The image processing method explained in the present embodiment is established if the correlation between the primary-color intensity and the control value of the output is grasped to perform the reverse γ-conversion, whatever value is defined as the primary-color intensity.

If the output device can be set such that the control value of the output device for the primary-color intensity takes a linear shape, the reverse γ-conversion becomes unnecessary, whereby the image processing method is more simplified. In the case of the LCD, the output device may be set such that the numerical value for setting an applied voltage and the value corresponding to the primary-color intensity become linear by providing any modifications to the circuit that generates the applied voltage.

When the image processing method according to the aforesaid embodiment is applied to an LCD, the result shown in FIG. 11 is obtained. FIG. 11 indicates the color shift when a certain CIE1931-xy chromaticity point is defined as a desired PCS value, and the Y value is changed (from the outputtable maximum value to its 20%). In order to obtain the graph shown in FIG. 11, the reverse γ-conversion having the correlation data between the primary-color intensity and the control value shown in FIG. 12 as an LUT is performed after the processing of the program shown in FIG. 7. The content of the processing is not a special one like the aforesaid processing, so that the detailed explanation thereof is omitted.

In the graph shown in FIG. 11, x mark indicates an input point, and this point is not color-shifted. The black diamond plot in FIG. 11 indicates the case where the image processing method according to the present embodiment is not performed, wherein it is calculated in such a manner that the output characteristic of the output device is supposed to be linear (the temporal RGB primary-color intensities are subjected to the reverse γ-conversion without making any alteration). The white rectangular plot in FIG. 11 indicates the result when the image processing method according to the present embodiment is executed fixed number of times, that is, twice. As apparent from the result shown in FIG. 11, the color shift is remarkably improved by performing the image processing method according to the present embodiment. A slight color shift appears on the white rectangular plot in FIG. 11, but this is because the above-mentioned control for preventing the dark-area-gradation deterioration is adopted. When the xy coordinates obtained by adding the PCS values for black of the output device to the desired PCS values are plotted to the graph in FIG. 11, they generally completely coincide with the white rectangular plots. When the processing is done with the use of the equation 22 with the occurrence of the dark-area-gradation deterioration allowed, they generally completely coincide with the x marks.

As described above, according to the image processing method in the present embodiment, a desired color coordinate can be outputted with high precision even for an output device having complicated optical characteristics, such as an LCD of TN mode, and a simple color coordinate conversion is possible. Further, since the image processing method according to the present embodiment does not need a large-capacity LUT or complicated process, the image processing method according to the present embodiment can be provided with high speed and reduced storage capacity.

Embodiment 2

In the embodiment 1, the second coordinate conversion 4 shown in FIG. 1 is discussed. However, in the case of sRGB (standard RGB) monitor in which an output device is connected to a PC for use, for example, the input device 1 shown in FIG. 1 is a PC, and its input is RGB data. Therefore, the γ value at the γ-conversion section 2 and the conversion matrix at the first coordinate conversion section 3 are unambiguously provided. Therefore, when the sRGB monitor is used for the output device 6, it is possible to put the first coordinate conversion section 3 and the second coordinate conversion section 4 shown in FIG. 1 together. Although, in the embodiment 1, the PCS values are handled as the coordinate of a standard color space such as XYZ values, for example, the PCS values can be defined as the RGB space for sRGB that can be controlled by the output device 1 in the present embodiment.

The PCS values are specifically defined by the RGB space of sRGB by setting the device characteristic data. For creating the device characteristic data, the output result specific to the output device is measured, and is recorded with the coordinate of the standard color space such as the XYZ values. For example, a certain determined color space such as sRGB has a conversion equation represented by an equation 23 by which it can be converted into the XYZ values with respect to the input RGB primary-color intensities IRs, IGs, and IBs.

$$\begin{pmatrix} X \\ Y \\ Z \end{pmatrix} = \begin{pmatrix} XR_s & XG_s & XB_s \\ YR_s & YG_s & YB_s \\ ZR_s & ZG_s & ZB_s \end{pmatrix} \begin{pmatrix} IR_s \\ IG_s \\ IB_s \end{pmatrix} \quad \text{[Equation 23]}$$

Accordingly, the coordinate value (for example, RGB space of sRGB) of the desired color space can be obtained from the XYZ values of the output device measured by utilizing the inverse conversion equation represented by the equation 23. Further, with the coordinate values obtained from the inverse conversion equation defined as the PCS values, the device characteristic data shown in the embodiment 1 is created and stored. Thus, the processing same as the processing in the embodiment 1 can be performed, whereby the first coordinate conversion section 3 and the second coordinate conversion section 4 can be put together. Moreover, the γ-conversion section 2 and the reverse γ-conversion section 5 shown in FIG. 1 are added to the conversion section that is obtained by putting the first coordinate conversion section 3 and the second coordinate conversion section 4 together, whereby the image processing method and image processing apparatus that are based upon the sRGB standard can easily be realized.

On the other hand, there may be the case in which correspondence to not only sRGB but also the other color space is required in a PC monitor. In this case, rather than putting the first coordinate conversion section 3 and the second coordinate conversion section 4 together as described above, it is more simple that only the processing at the first coordinate conversion section 3 is switched to correspond to the plural color spaces via the PCS of the standard color space once as shown in FIG. 1. Specifically, the image data inputted from the input device 1 shown in FIG. 1 is γ-converted with the color space (input data color space) defined by the input device 1, and the image data expressed by the input data color space at the first coordinate conversion section 3 is coordinate-converted into PCS.

In order to connect the color spaces of different devices, such as the connection between a digital camera and a display, the PCS of the standard color space is once used as shown in FIG. 1, and the second coordinate conversion section 4 is caused to do the processing in the embodiment 1, whereby the color shift caused by the output device is prevented. This processing can be operated in the PC interposed in the connection, or can be carried out in a device, if the device is an image processing apparatus having a reading device for a non-volatile storage medium.

As described above, the setting method of the device characteristic data and the related processings before or after the setting method are combined to the image processing 100 explained in the embodiment 1, thereby being capable of providing an image processing apparatus. Further, it is possible to provide an image output apparatus by combining an output device such as an LCD to an image processing apparatus including the image processing 100. Moreover, it is possible to provide an image processing system by combining a different device, for example, an input device such as a digital camera, to an image output apparatus.

Embodiment 3

In the image processing method explained in the embodiment 1, high precision correction can be done with reduced characteristic data specific to an output device, so that the dynamic device characteristic data can easily be set. There is a method of using a large-capacity LUT as described above for highly precise correction means. However, rewriting dynamically the large-capacity LUT is not so easy.

A characteristic (color or the like) of an image outputted from an output device is different depending upon light outside. In the case of a display, in particular, the characteristic varies due to various factors such as its secular change, temperature, viewing angle, and the like.

A calibration may be carried out for the correction of the output device subject to secular change. In the calibration, the output (for example, for every RGB (and black)) from the output device is measured with the use of a certain color sensor, and the device characteristic data is reproduced by the method described in the embodiment 1 or the embodiment 2 with the use of the result of the measurement. The device characteristic data may be calculated from the result of the measurement by a microcomputer incorporated in the output device, or the device characteristic data calculated by an external PC or the like may be written. The variation in each output device can be prevented by carrying out this calibration during the manufacturing process of the output device.

Figure 13:
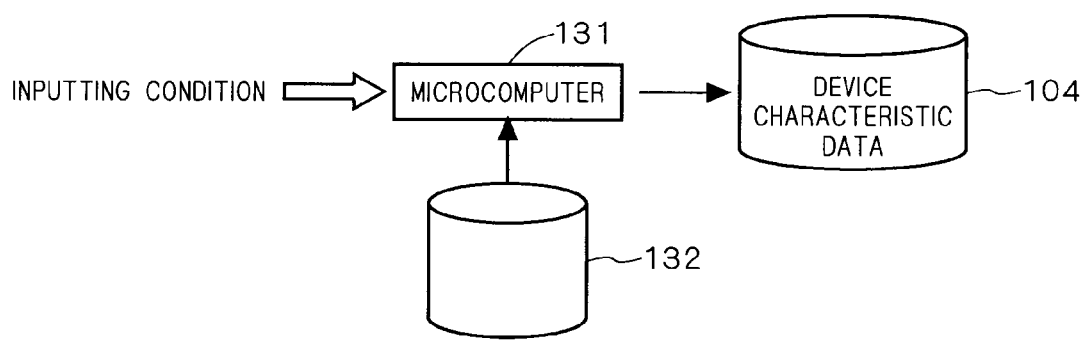
FIG. 13 is a block diagram of an image output apparatus according to an embodiment 3 of the present invention.

The processing described below is performed in order to prevent the change in the output characteristic of the output device caused by temperature or viewing angle. When the change in the output characteristic of the output device can be predicted beforehand, for example, control means shown in FIG. 13 can be executed. FIG. 13 is a block diagram of a system that changes the device characteristic data on the basis of the condition such as temperature or viewing angle. In FIG. 13, the factors that change the characteristic, such as temperature, viewing angle, light outside are inputted to a microcomputer 131 as conditions. Specifically, these conditions are inputted by various sensors or inputted by a user, and these conditions are detected by the microcomputer 131.

The microcomputer 131 acquires information from basic device characteristic data 132 on the basis of the inputted conditions. The microcomputer 131 rewrites the device characteristic data in the storage section 104, explained in the embodiment 1, on the basis of the information. Thus, highly precise color correction can be realized even if the output characteristic of the output device is changed due to temperature or viewing angle.

When the characteristic is changed due to temperature, for example, the aforesaid device characteristic data is measured beforehand at some different temperatures, and this information is stored at the basic device characteristic data 132. The microcomputer 131 acquires the characteristic corresponding to the current temperature from the basic device characteristic data 132, and writes this information in the storage section 104 as the device characteristic data.

When discrete data relating to temperature is included in the basic device characteristic data 132, the data other than the stored temperatures is obtained by using an interpolation technique such as linear interpolation. Further, when the device characteristic data is represented by a function in a polynomial, each coefficient can be given as the function of the temperature. In this case, the coefficient serving as the function of the temperature is stored in the basic device characteristic data 132, and the corresponding coefficient is calculated from the given temperature condition to generate the device characteristic data.

In the present embodiment, since the data amount of the device characteristic data is small, the dynamic parameter change, which is difficult to be realized by the large-capacity LUT, can be easily done. Therefore, the variation in the output characteristic of each output device by the calibration, and the color shift caused by the characteristic change due to the secular change and external factors can be prevented.

Embodiment 4

In the case of a transparent-type liquid crystal display device, the light transmittance of backlight to a liquid crystal element is normally adjusted to display an image. In a common liquid crystal display device, the quantity of light of the backlight upon displaying black and the quantity of light of the backlight upon displaying white are generally the same. Therefore, in the liquid crystal display device, the energy inputted to the backlight is consumed wastefully in particular in the case of black display. In the liquid crystal display device, even if the transmittance of the liquid crystal element is made minimum in order to display black, it cannot completely be made zero, and it has a finite value. Therefore, since the contrast ratio of the liquid crystal display device is obtained by dividing the white transmittance by the black transmittance, the contrast ratio is limited by the black transmittance. Further, when the black transmittance is high, a so-called black floating, in which black is not black upon displaying a dark image, is visually recognized. A technique for dynamically changing the quantity of light of the backlight according to the image to be displayed has been recently employed in order to overcome the drawback.

Specifically, the brightness information of the inputted image is obtained from the detection of the maximum value or by creating the histogram of brightness, and the required quantity of light of the backlight is determined on the basis of the result. Specifically, the quantity of light of the backlight is increased 1/k-fold (k>1) with respect to the maximum value, while the transmittance of the liquid crystal element is contrarily increased k-times that at the time when the quantity of light of the backlight is the maximum, whereby the same image can be displayed without wastefully consuming energy. As a result, as for the black display, if the quantity of light of the backlight is small, the quantity of light displayed with black is reduced, so that black becomes darker, and as for a dark chromatic color (for example, darkish red), the reduction in saturation is reduced since surplus black component is not added.

The technique for dynamically changing the quantity of light of the backlight is an effective means for overcoming the drawback in the transparent-type liquid crystal display device. However, the use of this means without any alteration causes the problem described below.

Specifically, the case where white having a brightness of 50% is inputted to all over the screen with the use of the LCD explained in the embodiment 1 will be explained. In the ordinary display, the backlight is outputted 100%, and the transmittance of the liquid crystal element is set to 50%. On the other hand, in the aforesaid display in which the brightness is controlled, the backlight is limited to 50%, whereby, even if the liquid crystal transmittance is set to 100%, the display brightness is regarded as the same, and hence, the power consumption can be reduced. However, as shown in FIGS. 4A, 4B and 4C, the characteristic of the liquid crystal element is not linear to the tristimulus value XYZ, so that the color is different in the aforesaid two displays. Specifically, bluish display is provided in the normal display, while yellowish display is provided in the display in which the brightness is controlled. Accordingly, when the aforesaid brightness control is performed, it is necessary to devise in order that the color is not changed depending upon the transmittance.

Figure 14:
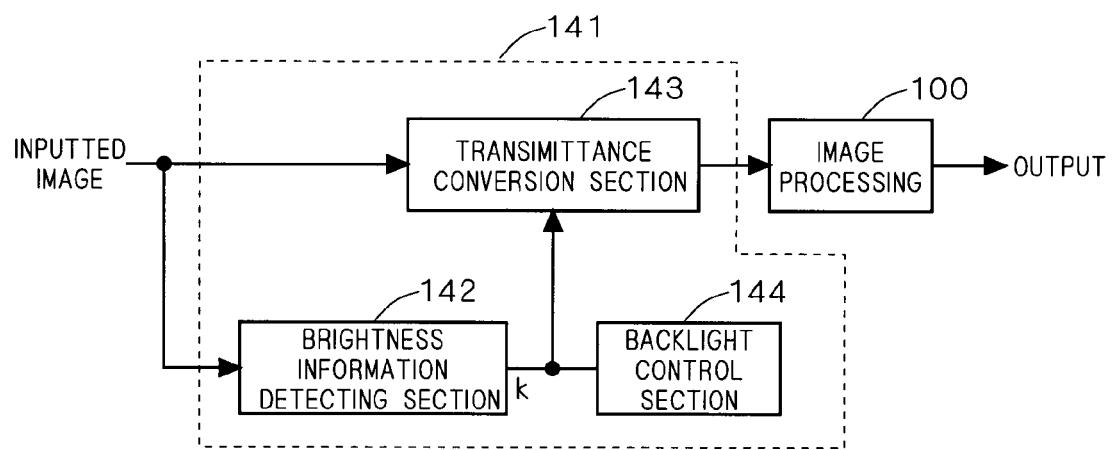
FIG. 14 is a block diagram of an image output apparatus according to an embodiment 4 of the present invention.

In view of this, the control shown in FIG. 14 is carried out in the present embodiment. In FIG. 14, a block diagram executing the image processing 100 explained in the embodiment 1 is illustrated after the brightness control block 141 that dynamically controls the transmittance of the backlight and the liquid crystal element. By executing the image processing 100 as described above, the chromaticity is kept constant, regardless of the transmittance of the liquid crystal element, whereby the color shift of the image to be outputted can be prevented. It is to be noted that the color space coordinate of PCS used by the image processing 100 is set to the color space inputted to the display. Alternatively, in case where a certain color coordinate conversion process is to be performed, PCS is set to the PCS (XYZ) of the standard color space, and a color coordinate conversion process to PCS may be inserted before the image processing 100 or brightness control block 141.

The brightness control block 141 shown in FIG. 14 includes a brightness information detecting section 142 that detects the brightness of the inputted image, a transmittance conversion section (image conversion section) 143 that increases k-fold the transmittance of the liquid crystal element at the time when the inputted image is displayed on the basis of the information k from the brightness information detection section 142, and a backlight control section (light source control section) 144 that increases 1/k-fold the brightness of the backlight on the basis of the information k from the brightness information detection section 142.

In FIG. 14, the descriptions of the γ-conversion and reverse γ-conversion are omitted. Ideally, the calculation is made with the use of the linear primary-color intensity obtained by performing the γ-conversion to the inputted image. However, the γ-conversion is sometimes omitted in view of the favor of apparent display formation or simplification of the calculation. Further, as for the backlight control and brightness information detection of the inputted image, there may be the case where the process for detecting the brightness is performed after the image is once stored in the frame memory. However, no special restriction is imposed on this point in the present invention, so that the description thereof is omitted from FIG. 14. A video signal is frequently driven with overvoltage in recent years, compared to the liquid crystal state of the frame or inputted image, in order to increase the optical response speed of the liquid crystal, and this process may be inserted after the image processing 100. Although a transparent-type liquid crystal display device (image output apparatus) is illustrated in the aforesaid explanation, a reflective-type liquid crystal display device (image output apparatus) using a front light may be employed.

As described above, the image output apparatus according to the present embodiment dynamically changes the brightness of the backlight (front light) in accordance with the inputted image, and suppresses the color shift even if the transmittance (reflectivity) of the image output element is changed, whereby a desired color can be realized.

Embodiment 5

The calculation of the equation 20 shown in the embodiment 1 can be realized by the source code shown in FIG. 7. However, when the circuit executing the source code shown in FIG. 7 is mounted to the image output apparatus (for example, liquid crystal display device) to which a real-time processing is required, there may be the case in which the number of logical circuits is somewhat increased. In view of this, the present embodiment provides a technique capable of mounting the calculation processing of the equation 20 with a very small scale.

If the output characteristic of the output device itself is not non-linear illustrated in FIGS. 4A, 4B and 4C, but linear, various color coordinate conversions can easily be performed by the coordinate conversion by the matrix calculation or the like. Therefore, the present embodiment simplifies the processing by performing the processing for compensating the non-linear characteristic of the output device itself to the linear characteristic. The processings shown in FIG. 5 of the embodiments 1 are specifically employed for the processing for compensating the non-linear characteristic of the output device itself to the linear characteristic.

The present embodiment explains the case of an LCD that outputs, with RGB, an image inputted with RGB. The equation 1 shown in the embodiment 1 is obtained in such a manner that the inputted image of RGB is γ-converted with the primary-color intensities in the linear space defined as IR, IG, and IB. The desired PCS values are obtained by the primary conversion represented by the equation 2 in the embodiment 1. However, attention is to be made on the compensation of the output characteristic of the output device itself, the conversion matrix of the equation 2 is not an optional matrix, but a matrix indicating the linear characteristic of the output device itself represented by the equation 9 in the embodiment 1. Therefore, putting the equation 2 and the equation 5 together, an equation 24 is obtained.

$$\begin{pmatrix} X_R & X_G & X_B \\ Y_R & Y_G & Y_B \\ Z_R & Z_G & Z_B \end{pmatrix} \begin{pmatrix} IR_s \\ IG_s \\ IB_s \end{pmatrix} = \begin{pmatrix} X_R(IR_D) + X_G(IG_D) + X_B(IB_D) \\ Y_R(IR_D) + Y_G(IG_D) + Y_B(IB_D) \\ Z_R(IR_D) + Z_G(IG_D) + Z_B(IB_D) \end{pmatrix} \quad \text{[Equation 24]}$$

It is to be noted that IRs, IGs, and IBs are those in which the RGB of the inputted image are the linear RGB primary-color intensities, and $IR_D$, $IG_D$, and $IB_D$ are the linear RGB primary-color intensities to be outputted (to be obtained). The conversion matrix at the left side in the equation 24 is such that the XYZ values at the time when the RGB primary-color intensities are respectively 1 (maximum value) as shown in the equation 9 are employed as components.

An equation 25 is obtained by changing the equation 24.

$$\begin{pmatrix} IR_s \\ IG_s \\ IB_s \end{pmatrix} = \begin{pmatrix} X_R & X_G & X_B \\ Y_R & Y_G & Y_B \\ Z_R & Z_G & Z_B \end{pmatrix}^{-1} \quad \text{[Equation 25]}$$

$$\left\{ \begin{pmatrix} X_R(IR_D) \\ Y_R(IR_D) \\ Z_R(IR_D) \end{pmatrix} + \begin{pmatrix} X_G(IG_D) \\ Y_G(IG_D) \\ Z_G(IG_D) \end{pmatrix} + \begin{pmatrix} X_B(IB_D) \\ Y_B(IB_D) \\ Z_B(IB_D) \end{pmatrix} \right\}$$

The functions $X_R(IR_D)$, $Y_R(IR_D)$, and $Y_R(IR_D)$ converted with the conversion matrix at the right side of the equation 25 are described as the functions of $RS_R(IR_D)$, $GS_R(IR_D)$, and $BS_R(IR_D)$. The functions $X_G(IR_D)$ and $X_B(IR_D)$ and the like are similarly described. The result of the description is represented by an equation 26.

$$\begin{pmatrix} IR_s \\ IG_s \\ IB_s \end{pmatrix} = \begin{pmatrix} RS_R(IR_D) \\ GS_R(IR_D) \\ BS_R(IR_D) \end{pmatrix} + \begin{pmatrix} RS_G(IG_D) \\ GS_G(IG_D) \\ BS_G(IG_D) \end{pmatrix} + \begin{pmatrix} RS_B(IB_D) \\ GS_B(IB_D) \\ BS_B(IB_D) \end{pmatrix} \quad \text{[Equation 26]}$$

$RS_R(IR_D)$, $GS_R(IR_D)$, and the like are generated in such a manner that the XYZ values of the output device are appropriately measured for every grayscale of RGB, and the measured values are subjected to the primary conversion by the conversion matrix. Any values in which the correlation is established with the reverse γ-conversion as described above can be employed for $IR_D$, $IG_D$, and $IB_D$. In the present embodiment, values standardized with the maximum values of the main output values (X, Y, Z) of the respective R, G and B defined as 1 are employed.

Next, the meaning of the equation 26 will be explained. The first term at the right side indicates the RGB primary-color intensities at the time when the R primary-color intensity of the output device is the input space (the space in case where the characteristic of the output device is linear). Similarly, the second term relates to the G primary-color intensity of the output device, and the third term relates to the B primary-color intensity of the output device. The values other than $RS_R(IR_D)$, $GS_G(IG_D)$, and $BS_B(IB_D)$ become zero if the characteristic of the output device is completely linear, and assume certain values if non-linear. In the following explanation, $RS_R(IR_D)$, $GS_G(IG_D)$, and $BS_B(IB_D)$ are referred to as main values.

However, the values other than the main values are smaller than the main values, and they are approximately several percents of the main values even if the LCD used in the present embodiment is actually calculated. An equation 27 is shown in which the main values in the equation 26 are described with bold characters for easy understanding.

$$\begin{pmatrix} IR_S \\ IG_S \\ IB_S \end{pmatrix} = \begin{pmatrix} \mathbf{RS_R(IR_D)} \\ GS_R(IR_D) \\ BS_R(IR_D) \end{pmatrix} + \begin{pmatrix} RS_G(IG_D) \\ \mathbf{GS_G(IG_D)} \\ BS_G(IG_D) \end{pmatrix} + \begin{pmatrix} RS_B(IB_D) \\ GS_B(IB_D) \\ \mathbf{BS_B(IB_D)} \end{pmatrix} \quad \text{[Equation 27]}$$

The differential matrix in the equation 11 in the present embodiment can be represented by an equation 28.

$$M_\Delta = \begin{pmatrix} RS'_R(IR_D) & RS'_G(IG_D) & RS'_B(IB_D) \\ GS'_R(IR_D) & GS'_G(IG_D) & GS'_B(IB_D) \\ BS'_R(IR_D) & BS'_G(IG_D) & BS'_B(IB_D) \end{pmatrix} \quad \text{[Equation 28]}$$

It is to be noted that $RS'_R(IR_D)$ indicates the differential coefficient in the vicinity of $IR_D$ of $RS_R(IR_D)$ (the same is true for the other differential coefficients). The differential coefficients shown in the equation 28 are also small values other than the main values. If the output characteristic of the output device is linear, its slope should be constant, so that the equation 28 is a unit matrix of a constant. When a matrix M is given as in an equation 29, a matrix equation is represented by an equation 30 and an inverse matrix is represented by an equation 31, in general.

$$M = \begin{pmatrix} A & b & c \\ d & E & f \\ g & h & I \end{pmatrix} \quad \text{[Equation 29]}$$

$$\text{Det}(M) = AEI + bfg + cdh - Afh - bdI - cEg \quad \text{[Equation 30]}$$

$$M^{-1} = \frac{1}{\text{Det}(M)} \begin{pmatrix} EI - fh & ch - bI & bf - cE \\ fg - dI & AI - cg & cd - Af \\ ah - Eg & bg - Ah & AE - bd \end{pmatrix} \quad \text{[Equation 31]}$$

In the equations 29 to 31, the values described with small letters are sufficiently smaller than the values described with capital letters. Therefore, if the product of more than two small letters is neglected, the equation 30 and the equation 31 can be approximated to an equation 32 and an equation 33.

$$\text{Det}(M) \approx AEI \quad \text{[Equation 32]}$$

$$M^{-1} \approx \frac{1}{AEI} \begin{pmatrix} EI & -bI & -cE \\ -dI & AI & -Af \\ -Eg & -Ah & AE \end{pmatrix} = \begin{pmatrix} \frac{1}{A} & \frac{-b}{AE} & \frac{-c}{AI} \\ \frac{-d}{AE} & \frac{1}{E} & \frac{-f}{EI} \\ \frac{-g}{AI} & \frac{-h}{EI} & \frac{1}{I} \end{pmatrix} \quad \text{[Equation 33]}$$

Next, when the relationship between the equation 32 and the equation 33 is applied to the equation 20, the equation 20 can be represented by an equation 34.

$$\begin{pmatrix} IR_D \\ IG_D \\ IB_D \end{pmatrix} = \begin{pmatrix} IR_S \\ IG_S \\ IB_S \end{pmatrix} \begin{pmatrix} \frac{1}{RS'_R(IR_S)} & \frac{-RS'_G(IG_S)}{RS'_R(IR_S)GS'_G(IG_S)} & \frac{-RS'_B(IB_S)}{RS'_R(IR_S)BS'_B(IB_S)} \\ \frac{-GS'_R(IR_S)}{RS'_R(IR_S)GS'_G(IG_S)} & \frac{1}{GS'_G(IG_S)} & \frac{-GS'_B(IB_S)}{GS'_G(IG_S)BS'_B(IB_S)} \\ \frac{-BS'_R(IR_S)}{RS'_R(IR_S)BS'_B(IB_S)} & \frac{-BS'_G(IG_S)}{GS'_G(IG_S)BS'_B(IB_S)} & \frac{1}{BS'_B(IB_S)} \end{pmatrix} \cdot$$

$$\begin{pmatrix} IR_S - \{RS_R(IR_S) + RS_G(IG_S) + RS_B(IB_S)\} \\ IG_S - \{GS_R(IR_S) + GS_G(IG_S) + GS_B(IB_S)\} \\ IB_S - \{BS_R(IR_S) + BS_G(IG_S) + BS_B(IB_S)\} \end{pmatrix}$$

[Equation 34]

Although the equation 34 seems to be complicated, it is obtained only by rewriting the inverse matrix of the equation 20, whereby the calculation amount is reduced compared to the actual calculation of the inverse matrix.

Further, the off-diagonal elements in the equation 34 are smaller than the diagonal elements, and the multiplied PCS error components are small, whereby the off-diagonal elements can be approximated to zero from the beginning. Therefore, the equation 34 can be represented by an equation 35.

$$\begin{pmatrix} IR_D \\ IG_D \\ IB_D \end{pmatrix} = \begin{pmatrix} IR_S \\ IG_S \\ IB_S \end{pmatrix} \begin{pmatrix} \frac{1}{RS'_R(IR_S)} & 0 & 0 \\ 0 & \frac{1}{GS'_G(IG_S)} & 0 \\ 0 & 0 & \frac{1}{BS'_B(IB_S)} \end{pmatrix}$$

$$\begin{pmatrix} IR_S - \{RS_R(IR_S) + RS_G(IG_S) + RS_B(IB_S)\} \\ IG_S - \{GS_R(IR_S) + GS_G(IG_S) + GS_B(IB_S)\} \\ IB_S - \{BS_R(IR_S) + BS_G(IG_S) + BS_B(IB_S)\} \end{pmatrix}$$

[Equation 35]

The calculation amount of the equation 35 relating to the calculation of the inverse matrix and the calculation of the matrix product afterward is remarkably reduced compared to the equation 34. Further, the linear RGB primary-color intensities inputted without performing the calculation can be used as they are for the temporal RGB primary-color intensities. When the image processing 100 according to the embodiment 1 is performed by using the equation 35, the precision, which is obtained by repeating the calculation of the equation 20 twice, can be achieved by one calculation, in the case of the LCD having the characteristic shown in FIG. 3.

FIG. 15 shows a source code for realizing the processing represented by the equation 35. In the processing shown in FIG. 15, the γ-conversion and reverse γ-conversion are also omitted, and the repeated processing is also omitted. Therefore, FIG. 15 describes that the outputs $IR_D$, $IG_D$, and $IB_D$ can be obtained from the inputted $IR_S$, $IG_S$ and $IB_S$. In order to avoid the increase of troublesomeness of the processing, the acquisition of the predicted PCS values and differential coefficient is represented by a function, and omitted from the description of the code in FIG. 15. When the values other than the main values are made zero in the calculation of the PCS errors that is the second term of the equation 35, RGB are totally independent, which is equivalent to the processing in which the γ-conversion control is independently executed for every RGB. In the characteristic of the LCD used in the present embodiment, when $IR_D$, $IG_D$ and $IB_D$ are selected for X, Y, and Z values of RGB, the diagonal element in the inverse matrix is approximately 1 and generally constant, with the result that, even if the inverse matrix is approximated to the unit matrix in the calculation of the PCS errors at the second term, the correction result having relatively high precision can be obtained. Specifically, an equation 36 represents that the inverse matrix of the equation 35 is defined as the unit matrix.

$$\begin{pmatrix} IR_D \\ IG_D \\ IB_D \end{pmatrix} = \begin{pmatrix} 2IR_S - \{RS_R(IR_S) + RS_G(IG_S) + RS_B(IB_S)\} \\ 2IG_S - \{GS_R(IR_S) + GS_G(IG_S) + GS_B(IB_S)\} \\ 2IB_S - \{BS_R(IR_S) + BS_G(IG_S) + BS_B(IB_S)\} \end{pmatrix}$$

[Equation 36]

Accordingly, multiplication and division are unnecessary in the equation 36 (doubling is made by a left shift calculation of bit). FIG. 16 shows a specific source code. When the processing of the source code in FIG. 16 is performed, an error is not produced between the result of the calculation of the predicted PCS values and the actual output result of the device, and if there is no cancellation for the other calculations, the distance Δxy to the CIE-x, y coordinate outputted from the CIE-x, y coordinate of the desired value can be suppressed to be not more than about 0.002 in one calculation.

In order to further simplify the equation 36, the fact that the values of $IR_S$ and $RS_R(IR_S)$, values of $IG_S$ and $GS_G(IG_S)$, and values of $IB_S$ and $BS_B(IB_S)$ are close to each other may be utilized. The equation 36 can be rewritten as an equation 37 by using this fact.

$$\begin{pmatrix} IR_D \\ IG_D \\ IB_D \end{pmatrix} = \begin{pmatrix} IR_S - \{RS_G(IG_S) + RS_B(IB_S)\} \\ IG_S - \{GS_R(IR_S) + GS_B(IB_S)\} \\ IB_S - \{BS_R(IR_S) + BS_G(IG_S)\} \end{pmatrix}$$

[Equation 37]

FIG. 17 shows the source code in the equation 37. When the processing of the source code in FIG. 17 is performed, an error is not produced between the result of the calculation of the predicted PCS values and the actual output result of the device, and if there is no cancellation for the other calculations, Δxy can be suppressed to be not more than about 0.004.

The approximate calculation for deriving the equation 36 and the equation 37 is performed by utilizing the fact that the element of the main values $\{RS_R(IR_D), GS_G(IG_D), BS_B(IB_D)\}$ is close to the straight line having a slope of 1. When the three elements are focused, they are respectively the one-dimensional equation of the control values $(IR_D, IG_D, IB_D)$. Therefore, if $IR_D$, $IG_D$, and $IB_D$ are appropriately selected, the elements of the main values are completely made to the straight line having a slope of 1. Thus, the approximate precision is more enhanced. Specifically, the grayscale characteristics of $RS_R$, $GS_R$, ... $BS_B$ are calculated from the measured XYZ values of the device, and then, $RS_R$, $GS_G$, and $BS_B$ have only to be set to $IR_D$, $IG_D$, and $IB_D$.

In the case of the output characteristic of the output device from which the desired precision cannot be obtained from the equation 37, the equation 36 may be used. When the precision is insufficient even by using the equation 36, the equations 34 and 35 are used. The inverse matrix may be finally calculated without using the equation 34 or 35. Alternatively, the precision can be enhanced by performing the repeated processing as described in the embodiment 1. In this case, after the second time, only the minuends $IR_S$, $IG_S$, and $IB_S$ at the calculation portion of the PCS errors at the second term at the right side in the equation 34 or 35 are fixed to the RGB primary-color intensities at the time of the input, and newly obtained values are substituted in other $IR_S$, $IG_S$, and $IB_S$.

In any of the calculation results for simplification, the components other than R, other than G, and other than B are always added for every RGB to be outputted, and these components are factors for enhancing precision in the γ-conversion independently performed for every RGB. Therefore, a part of the values that are found to be small may be omitted at the second and the following terms at the right side of the equation 37. It is important that the PCS predicted values other than R, other than G, and other than B of the output device are finally added to any one of the calculations of $IR_D$, $IG_D$, and $IB_D$.

Next, in the case of the control considering black as described in the embodiment 1, the calculation of the PCS errors at the second term in the equation 35 may be changed to an equation 38.

$$\begin{pmatrix} IR_S - \{RS_R(IR_S) + RS_G(IG_S) + RS_B(IB_S) + R_0\} \\ IG_S - \{GS_R(IR_S) + GS_G(IG_S) + GS_B(IB_S) + G_0\} \\ IB_S - \{BS_R(IR_S) + BS_G(IG_S) + BS_B(IB_S) + B_0\} \end{pmatrix} \quad \text{[Equation 38]}$$

Here, $R_O$, $G_O$, and $B_O$ are those obtained by converting the XYZ values ($X_O$, $Y_O$, $Z_O$) measured upon the black display with an equation 39.

$$\begin{pmatrix} R_0 \\ G_0 \\ B_0 \end{pmatrix} = \begin{pmatrix} X_R & X_G & X_B \\ Y_R & Y_G & Y_B \\ Z_R & Z_G & Z_B \end{pmatrix}^{-1} \begin{pmatrix} X_0 \\ Y_0 \\ Z_0 \end{pmatrix} \quad \text{[Equation 39]}$$

According to the present embodiment, the differential coefficient matrix is generally diagonalized by making the PCS coordinate into a linear space that is close to the output characteristic of the output device itself, and the calculation whose result becomes close to a constant (0 or 1) is not performed, whereby the calculation amount can remarkably be reduced. Specifically, in the present embodiment, a part of or all of the steps relating to the calculation of the inverse matrix such as the differential coefficient matrix creating step 102 or the inverse matrix calculating step 103 can be omitted. Further, in case where each element acquired in the calculation process of the predicted output value calculating step is generally the same as the temporal primary-color intensity or can be approximated to zero, the calculation relating to the element can be omitted. The PCS coordinate is of course not limited to the above-mentioned case. The calculation amount can be reduced by selecting the space so as to obtain the differential coefficient matrix such as the diagonal matrix or orthogonal matrix (the inverse matrix is a transposed matrix) that simplifies the calculation of the inverse matrix.

In the present embodiment, a series of image processings is used only to compensate the non-linear characteristic of the output device. Therefore, the color space of the input image becomes the linear color space of the output device. However, the invention is not limited thereto. In case where an image signal of another color space is intended to be inputted, the image signal may be inputted after a coordinate conversion such as a linear conversion is once performed. Since the linear coordinate conversion requires a calculation amount smaller than that of the inverse matrix, it is considered that this operation is advantageous in view of the total processing.

While the invention has been described in detail, the foregoing description is in all aspects illustrative and not restrictive. It is understood that numerous other modifications and variations can be devised without departing from the scope of the invention.

What is claimed is:

1. An image processing apparatus comprising:
    a storage section that holds characteristic data for acquiring a coordinate in a predetermined designated color space from a controllable primary-color intensity in an output device outputting an image;
    a predicted output value calculating section that calculates a predicted coordinate in said predetermined designated color space from a temporal primary-color intensity by using said characteristic data held at said storage section;
    an error calculating section that calculates an error from a difference between the coordinate to be outputted in said predetermined designated color space and said predicted coordinate;
    a differential coefficient matrix creating section that calculates a partial differential coefficient of said predicted coordinate value at said temporal primary-color intensity, and arranges the calculated partial differential coefficient into a square matrix to create a differential coefficient matrix, by using said characteristic data held in said storage section;
    an inverse matrix calculating section that calculates an inverse matrix of said differential coefficient matrix calculated at said differential coefficient matrix creating section;
    a primary-color intensity correction amount calculating section that calculates a corrected primary-color intensity by performing a primary conversion to the difference between said coordinate to be outputted and said predicted coordinate with said inverse matrix defined as a conversion matrix; and
    a primary-color intensity correction section that calculates an output primary-color intensity by adding or subtracting to or from said temporal primary-color intensity said corrected primary-color intensity calculated at said primary-color intensity correction amount calculating section.

2. The image processing apparatus according to claim 1, further comprising:
    an end determination section that inputs, as said temporal primary-color intensity, said output primary-color intensity to said predicted output value calculating section and said differential coefficient matrix creating section until a predetermined condition is satisfied.

3. The image processing apparatus according to claim 1, further comprising:
    a reverse γ-conversion section that converts said output primary-color intensity into a control value supplied to said output device,
    wherein said output primary-color intensity is selected in such a manner that tristimulus value measured for every primary color is made close to be linear, and the correlation with said control value is stored in said reverse γ-conversion section.

4. The image processing apparatus according to claim 1, wherein
    said storage section holds said characteristic data that is used at said predicted output value calculating section and produced on the basis of the coordinate obtained by subtracting the measured black coordinate from the coordinate in said predetermined designated color space measured for every controllable primary-color intensities in said output device.

5. The image processing apparatus according to claim 4, wherein
    said storage section holds said black coordinate of said output device, and
    said predicted output value calculating section adds said black coordinate to the calculated predicted coordinate.

6. The image processing apparatus according to claim 1, wherein
    when a value outside the range of the controllable primary-color intensity in said output device is inputted, said predicted output value calculating section calculates said predicted coordinate outside the range with a linear extrapolation by using said predicted coordinate close to said value outside the range and the differential coefficient at said predicted coordinate, and when a value outside the range of the controllable primary-color intensity in said output device is inputted, said differential coefficient matrix creating section employs the partial differential coefficient, positioned at the side close to said value outside the range and corresponding to said predicted coordinate within the range, as a partial differential coefficient of the value outside the range.

7. The image processing apparatus according to claim 1, further comprising:

a γ-conversion section in which said predetermined designated color space is defined as a color space inputted from an input device, and which γ-converts the image data inputted from the input device with a γ-value defined by said predetermined designated color space.

8. The image processing apparatus according to claim 1, further comprising:

a γ-conversion section that γ-converts the image data inputted from an input device in accordance with a γ-value defined by the color space of the inputted data, and a coordinate conversion section that coordinate-converts said image data represented by said color space of the inputted data into said predetermined designated color space.

9. The image processing apparatus according to claim 1, wherein said predetermined designated color space is employed, in which values of each element in said differential coefficient matrix created at said differential coefficient matrix creating section are generally constant, and said differential coefficient matrix can be approximated to a diagonal matrix or an orthogonal matrix.

10. The image processing apparatus according to claim 1, wherein a linear space close to the output characteristic of said output device is employed as said predetermined designated color space, and said inverse matrix is approximated to the diagonal matrix so as not to utilize each element of the value of approximately 0 or approximately 1 for the calculation, whereby a part or all parts relating to the calculation of said inverse matrix are omitted.

11. The image processing apparatus according to claim 10, wherein when each element obtained in the calculation process by said predicted output value calculating section is generally the same as said temporal primary-color intensity or can be approximated to 0, the calculation relating to said element is omitted.

12. An image output apparatus comprising:

a storage section that holds characteristic data for acquiring a coordinate in a predetermined designated color space from a controllable primary-color intensity in an output device outputting an image;

a predicted output value calculating section that calculates a predicted coordinate in said predetermined designated color space from a temporal primary-color intensity by using said characteristic data held at said storage section;

an error calculating section that calculates an error from a difference between the coordinate to be outputted in said predetermined designated color space and said predicted coordinate;

a differential coefficient matrix creating section that calculates a partial differential coefficient of said predicted coordinate value at said temporal primary-color intensity, and arranges the calculated partial differential coefficient into a square matrix to create a differential coefficient matrix, by using said characteristic data held in said storage section;

an inverse matrix calculating section that calculates an inverse matrix of said differential coefficient matrix calculated at said differential coefficient matrix creating section;

a primary-color intensity correction amount calculating section that calculates a corrected primary-color intensity by performing a primary conversion to the difference between said coordinate to be outputted and said predicted coordinate with said inverse matrix defined as a conversion matrix;

a primary-color intensity correction section that calculates an output primary-color intensity by adding or subtracting to or from said temporal primary-color intensity said corrected primary-color intensity calculated at said primary-color intensity correction amount calculating section; and an output device that outputs an image on the basis of said output primary-color intensity outputted from said image processing apparatus.

13. The image output apparatus according to claim 12, wherein the output of said output device measured for every manufactured product is measured, and said storage section in said image processing apparatus is updated with characteristic data produced based upon the result of said measurement.

14. The image output apparatus according to claim 12, wherein the output of said output device is measured every time a predetermined duration of use has elapsed, and said storage section in said image processing apparatus is updated with new characteristic data produced on the basis of the result of said measurement.

15. The image output apparatus according to claim 12, wherein said output device has a light source, wherein a predetermined image is displayed by controlling light from said light source, and said image output apparatus further comprises:

a brightness information detection section that detects brightness information of the inputted image data;

a light source control section that controls a quantity of light-emission amount from said light source in accordance with said brightness information; and an image conversion section that corrects the brightness of said image data on said output device on the basis of the control amount of said light source control section or said brightness information, wherein said image data outputted from said image conversion section is processed by said image processing apparatus.

16. The image output apparatus according to claim 12, wherein a grayscale setting of said output device is performed such that the control value of said output device and said output primary-color intensity outputted from said image processing apparatus become linear.

17. An image processing system comprising:

an image processing apparatus including:

a storage section that holds characteristic data for acquiring a coordinate in a predetermined designated color space from a controllable primary-color intensity in an output device outputting an image;

a predicted output value calculating section that calculates a predicted coordinate in said predetermined designated color space from a temporal primary-color intensity by using said characteristic data held at said storage section;

an error calculating section that calculates an error from a difference between the coordinate to be outputted in said predetermined designated color space and said predicted coordinate;

a differential coefficient matrix creating section that calculates a partial differential coefficient of said predicted coordinate value at said temporal primary-color intensity, and arranges the calculated partial differential coefficient into a square matrix to create a differential coefficient matrix, by using said characteristic data held in said storage section;

an inverse matrix calculating section that calculates an inverse matrix of said differential coefficient matrix calculated at said differential coefficient matrix creating section;

a primary-color intensity correction amount calculating section that calculates a corrected primary-color intensity by performing a primary conversion to the difference between said coordinate to be outputted and said predicted coordinate with said inverse matrix defined as a conversion matrix; and a primary-color intensity correction section that calculates an output primary-color intensity by adding or subtracting to or from said temporal primary-color intensity said corrected primary-color intensity calculated at said primary-color intensity correction amount calculating section, said system further comprising:

an input device that inputs image data to said image processing apparatus; and an output device that outputs an image on the basis of the output primary-color intensity outputted from said image processing apparatus.

18. An image processing method comprising:

a predicted output value calculating step that calculates, by using characteristic data for acquiring a coordinate in a predetermined designated color space from a controllable primary-color intensity in an output device outputting an image, a predicted coordinate in said predetermined designated color space from a temporal primary-color intensity;

an error calculating step that calculates an error from a difference between the coordinate to be outputted in said predetermined designated color space and said predicted coordinate;

a differential coefficient matrix creating step that calculates a partial differential coefficient of said predicted coordinate at said temporal primary-color intensity, and arranges the calculated partial differential coefficient into a square matrix to create a differential coefficient matrix, by using said characteristic data;

an inverse matrix calculating step that calculates an inverse matrix of said differential coefficient matrix calculated at said differential coefficient matrix creating step;

a primary-color intensity correction amount calculating step that calculates a corrected primary-color intensity by performing a primary conversion to the difference between said coordinate to be outputted and said predicted coordinate with said inverse matrix defined as a conversion matrix; and a primary-color intensity correction step that calculates an output primary-color intensity by adding or subtracting to or from said temporal primary-color intensity said corrected primary-color intensity calculated at said primary-color intensity correction amount calculating step.

19. The image processing method according to claim 18, wherein a linear space close to the output characteristic of said output device is employed as said predetermined designated color space, and said inverse matrix is approximated to the diagonal matrix so as not to utilize each element of the value of approximately 0 or approximately 1 for the calculation, whereby a part or all of the steps relating to the calculation of said inverse matrix are omitted.

20. The image processing method according to claim 18, wherein when each element obtained in the calculation process by said predicted output value calculating step is generally the same as said temporal primary-color intensity or can be approximated to 0, the calculation relating to said element is omitted.

* * * * *